(12) United States Patent  
Hayakawa

(10) Patent No.: US 7,646,499 B2  
(45) Date of Patent: Jan. 12, 2010

(54) IMAGE FORMING APPARATUS

(75) Inventor: Masafumi Hayakawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 793 days.

(21) Appl. No.: 11/358,403

(22) Filed: Feb. 22, 2006

(65) Prior Publication Data

US 2006/0187481 A1   Aug. 24, 2006

(30) Foreign Application Priority Data

Feb. 24, 2005  (JP) .............................. 2005-048787

(51) Int. Cl.  
    *G06K 15/00* (2006.01)
(52) U.S. Cl. .................................... 358/1.14; 358/1.16
(58) Field of Classification Search ................ 358/1.14, 358/1.15, 1.16, 404  
    See application file for complete search history.

(56) References Cited

U.S. PATENT DOCUMENTS

| | | | |
|---|---|---|---|
| 6,067,168 A * | 5/2000 | Nishiyama et al. | 358/1.16 |
| 6,141,112 A * | 10/2000 | Nishiyama et al. | 358/1.16 |
| 6,400,465 B1 * | 6/2002 | Nishiyama et al. | 358/1.16 |
| 7,170,622 B2 * | 1/2007 | Nobuhara et al. | 358/1.14 |
| 7,349,118 B2 * | 3/2008 | Zipprich et al. | 358/1.16 |
| 2002/0135816 A1 * | 9/2002 | Ohwa | 358/474 |
| 2005/0141020 A1 * | 6/2005 | Harano | 358/1.15 |
| 2008/0002231 A1 * | 1/2008 | Kinoshita | 358/296 |

FOREIGN PATENT DOCUMENTS

JP        2004-249625       9/2004

* cited by examiner

*Primary Examiner*—Kimberly A Williams  
(74) *Attorney, Agent, or Firm*—Rabin & Berdo, P.C.

(57) ABSTRACT

An authentication code detecting unit detects data addition authentication information from a print job. An upper apparatus specifying unit specifies a transmitting source of the print job. A RAM stores the data addition authentication information, the transmitting source of the print job, and the print job. An operating unit receives print request authentication information. An elapsed time measuring unit measures an elapsed time from the reception of the print job having the data addition authentication information. An erasure extension necessity inquiry unit requests an answer about the necessity of extension of an erasing time from the transmitting source when the measurement result indicates the elapse of a predetermined time. When the erasure extension is necessary, an erasure/extension decision processing unit extends the elapsed time until the erasure of the print job after its reception.

10 Claims, 15 Drawing Sheets

FIG.3

EXTENSION NECESSITY CONFIRMATION OF CONFIDENTIAL PRINTING

| [TIME] | [FILE] | [THE NUMBER OF PAGES] |
|---|---|---|
| YYYY/MM/DD  HH/MM | xxxx.txt | PP |

THE DATA IS ERASED FROM PRINTER 1 AFTER 5 MIN.

EXTEND TIME UNTIL DATA IS ERASED FROM PRINTER 1?

| YES | NO |

FIG.5

DELETION NOTIFICATION OF CONFIDENTIAL PRINTING

〖TIME〗 〖FILE〗 〖THE NUMBER OF PAGES〗

YYYY/MM/DD HH/MM xxxx.txt PP

THE DATA WAS ERASED FROM PRINTER 1 BECAUSE THERE IS NO EXTENSION REQUEST.

CLEAR DISPLAY

IMAGE FORMING APPARATUS

BACKGROUND OF THE INVENTION

1. Field of the Invention

The invention relates to an image forming apparatus and, more particularly, to authentication printing of an image forming apparatus connected to a network.

2. Related Background Art

In recent years, there are many cases where a plurality of upper apparatuses use one image forming apparatus in common through a network. In such an environment, if the image forming apparatus receives a print job with a password from the upper apparatus, the print job is temporarily stored into a RAM (random access memory) in the image forming apparatus. The image forming apparatus collates a password inputted by the operator into the image forming apparatus with the password added to the print job. If both of the passwords coincide, the image forming apparatus executes a printing process. If there is no input of the password by the operator in a predetermined time, the print job which has once been stored in the RAM is erased. (Refer to JP-A-2004-249625.) Therefore, if the predetermined time has elapsed due to some situation until the operator inputs the password into the image forming apparatus, he has to repetitively transmit the print job again.

SUMMARY OF THE INVENTION

It is a problem to be solved that, since the print job which has once been stored in the RAM is erased if there is no input of the password in the predetermined time, if the predetermined time has elapsed due to some situation until the operator inputs the password into the image forming apparatus, he has to repetitively transmit the print job again.

It is, therefore, an object of the invention to improve the authentication printing of an image forming apparatus connected to a network.

According to the present invention, there is provided an image forming apparatus for receiving a print job having data addition authentication information and print-outputting on the basis of a result of a collation with print request authentication information, comprising:

a data addition authentication information detecting section which detects the data addition authentication information from the print job;

a transmitting source specifying section which specifies a transmitting source of the print job;

a storing unit which stores the detected data addition authentication information, the specified transmitting source of the print job, and the print job having the data addition authentication information;

an input unit which receives the print request authentication information;

an elapsed time measuring section which measures an elapsed time from the reception of the print job having the data addition authentication information;

an erasure extension necessity inquiry section which requests an answer about necessity of an erasing time extension from the transmitting source when a result of the measurement by the elapsed time measuring section indicates elapse of a predetermined time; and an erasure/extension decision processing section which, if the answer result by the erasure extension necessity inquiry section indicates that the erasure extension is necessary, extends an elapsed time until the print job is erased after the reception of the print job by a predetermined time.

Moreover, the image forming apparatus may further comprise an apparatus state detecting unit which monitors the occurrence and recovery of an abnormal state in the apparatus and measures a time until the abnormal state is recovered after the occurrence of the abnormal state. In the case, the erasure/extension decision processing section stops progress of the elapsed time until the print job is erased after the reception of the print job for a period of time until the abnormal state is recovered after the occurrence of the abnormal state measured by the apparatus state detecting unit.

Moreover, the image forming may further comprise an erasure extension number history managing unit which manages the number of times of the operation by the erasure extension necessity inquiry section for requesting the answer about the necessity of the erasing time extension from a predetermined upper apparatus, and when the number of operation times reaches a predetermined number of times, erases the print job having the data addition authentication information and its attribute management information from the storing unit without making the extension request to the corresponding upper apparatus.

Moreover, in the image forming apparatus, the erasure extension necessity inquiry section further has a function of, when an inquiry of confidential data information regarding the print job having the data addition authentication information is made by an upper apparatus other than the transmitting source, transmitting the confidential data information to the upper apparatus which made the inquiry and receiving an extension/deletion request of the confidential data.

Moreover, in the image forming apparatus, when the answer result indicates that the erasure extension is unnecessary, the erasure/extension decision processing section erases the data addition authentication information, the transmitting source of the print job, and the print job having the data addition authentication information from the storing unit.

Moreover, in the image forming apparatus, when the answer result indicates that the erasure extension is unnecessary, the erasure/extension decision processing section sends the print job stored in the storing unit to the transmitting source of the print job, and erases the transmitting source of the print job.

Further, according to the present invention, there is also provided an image forming apparatus for printing and outputting a stored print job, comprising:

a communicating section to execute a communication with an upper apparatus;

a storing section to store the print job received from the upper apparatus by the communicating section;

a time measuring unit to measure a stored time of the stored print job data addition authentication information detecting section which detects the data addition authentication information from the print job; and an erasure/extension decision processing section which inquires of the upper apparatus whether it is necessary to extend to store the print job stored in the storing section after the stored time of the print job elapses a previously decided time, if judges that it is not necessary to extend, sends the print job stored in the storing section to the upper apparatus via the communicating section, and erases the print job from the storing section.

In the image forming apparatus, when the measurement result indicates the elapse of the predetermined time, the erasure extension necessity inquiry means requests an answer about the necessity of the extension of the erasing time from the transmitting source. If the answer result shows that the erasure extension is necessary, the elapsed time until the print job is erased after its reception is extended. Therefore, even if the predetermined time has elapsed due to some situation until the operator inputs the password into the image forming apparatus, an effect in which the operator doesn't need to repetitively transmit the print job again is obtained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is an image for confirming the necessity of extension of confidential printing;

FIG. 5 is an image for an erasure notification of a confidential print job;

DETAILED DESCRIPTION OF THE PREFERRED EMBODIMENTS

In an image forming apparatus according to the invention, all of data addition authentication information detecting means, transmitting source specifying means, elapsed time measuring means, erasure extension necessity inquiry means, and erasure/extension decision processing means are constructed by computer control means which is activated when a CPU (microprocessor) provided in the apparatus executes a predetermined control program which has previously been stored in a ROM (read only memory).

Embodiment 1

Figure 1:
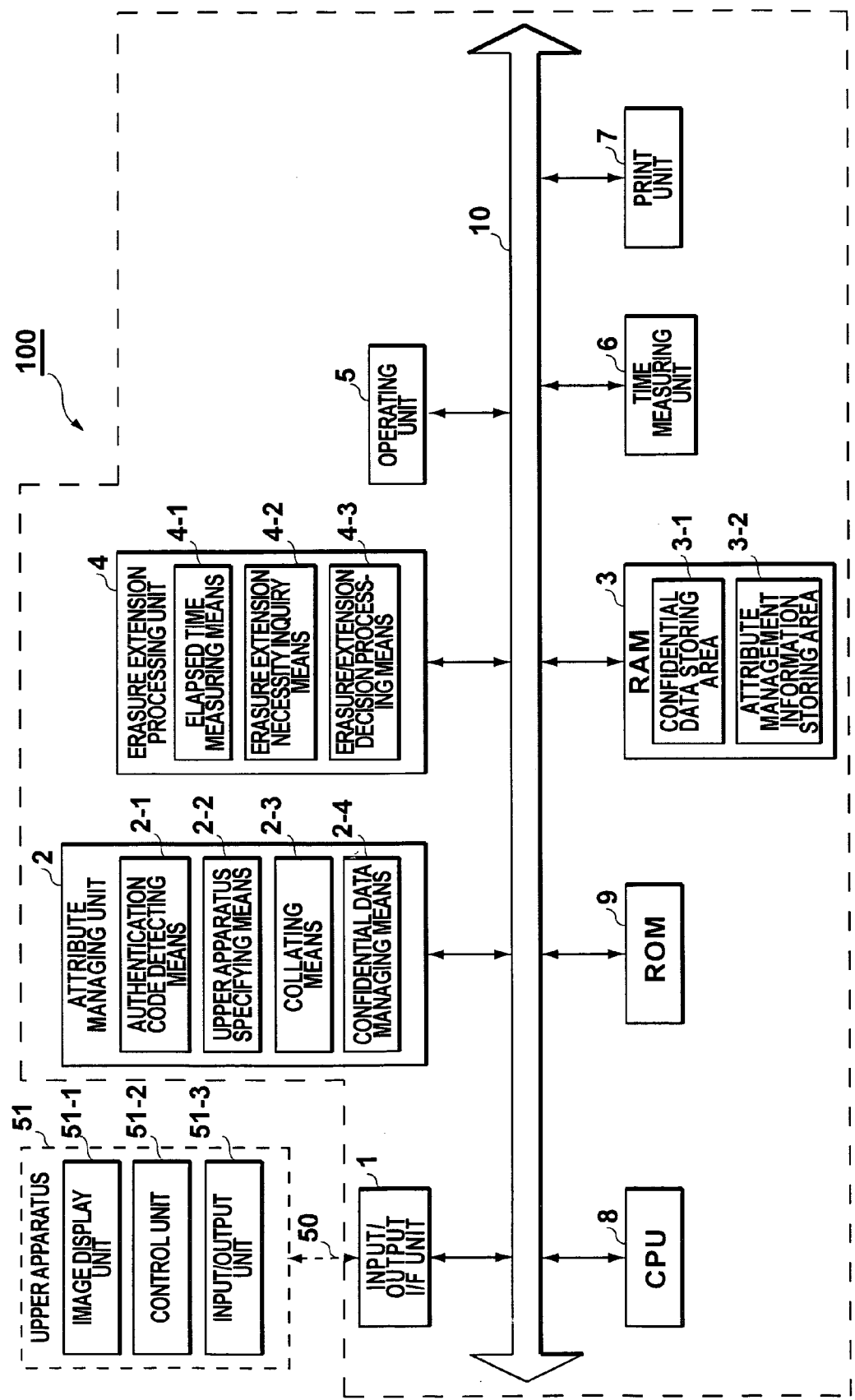
FIG. 1 is a block diagram showing a construction of the embodiment 1.

FIG. 1 is a block diagram showing a construction of the embodiment 1.

As shown in the diagram, an image forming apparatus 100 of the embodiment 1 comprises: an input/output interface (I/F) unit 1; an attribute managing unit 2; a RAM 3; an erasure extension processing unit 4; an operating unit 5; a time measuring unit 6; a print unit 7; a CPU 8; a ROM 9; and a common bus 10. A construction of the image forming apparatus 100 will be described in detail hereinbelow. However, explanation of a portion regarding processes of an ordinary print job in the image forming apparatus 100 is omitted and only a portion regarding processes of a print job which needs collation of a password (hereinbelow, such a job is referred to as a confidential print job) will be described.

The input/output I/F unit 1 is an interface portion for connecting communication between the image forming apparatus 100 and an upper apparatus 51 through a network 50.

The attribute managing unit 2 has therein: authentication code detecting means 2-1; upper apparatus specifying means 2-2; collating means 2-3; and confidential data managing means 2-4. The attribute managing unit 2 is a portion to manage the confidential print job received from the upper apparatus 51 through the input/output I/F unit 1. This portion is activated by the CPU 8 which executes a predetermined control program which has previously been stored in the ROM 9.

The authentication code detecting means 2-1 detects a password added to the received confidential print job (hereinbelow, such a password is referred to as data addition authentication information) and stores it into an attribute management information storing area 3-2 in the RAM 3.

The upper apparatus specifying means 2-2 specifies the transmitting source from a transmission side address of the received confidential print job and stores the transmission side address (for example, IP address or the like) into the attribute management information storing area 3-2 in the RAM 3.

The collating means 2-3 collates the data addition authentication information (password) added to the received confidential print job with a password of the operator inputted by the operator through the operating unit 5 by obtaining a print output of the print job (hereinbelow, such a password is referred to as print request authentication information), and outputs a result of the collation.

The confidential data managing means 2-4 manages the data addition authentication information (password) and a storage address in the attribute management information storing area 3-2 of the transmission side address of the confidential print job. Further, the confidential data managing means 2-4 manages a storage address of the confidential print job in a confidential data storing area 3-1.

The RAM 3 is a random access memory to form an arithmetic operating area which is necessary in a step wherein the CPU 8 executes the control program which has previously been stored in the ROM 9. In the embodiment, particularly, the RAM 3 is a random access memory to form the confidential data storing area 3-1 and the attribute management information storing area 3-2 besides the ordinary arithmetic operating area.

The confidential data storing area 3-1 is an area for storing the confidential print job received from the upper apparatus 51 through the input/output I/F unit 1. This storage address is managed by the confidential data managing means 2-4.

The attribute management information storing area 3-2 is an area for storing the data addition authentication information (password) detected by the authentication code detecting means 2-1 and a transmitting source address of the print data specified by the upper apparatus specifying means 2-2. This storage address is managed by the confidential data managing means 2-4.

The erasure extension processing unit 4 has therein: elapsed time measuring means 4-1; erasure extension necessity inquiry means 4-2; and erasure/extension decision processing means 4-3. When a predetermined time elapses from the reception of the confidential print job, the erasure extension processing unit 4 requests an answer about the necessity of the extension of the erasing time from the transmitting source. If a result of the answer indicates that the erasure extension is necessary, the elapsed time until the print job is erased after its reception is extended. If the answer result indicates that the erasure extension is unnecessary or if there is no answer, the confidential print job is erased. This portion is activated by the CPU 8 which executes a predetermined control program which has previously been stored in the ROM 9.

The elapsed time measuring means 4-1 measures the elapsed time from the reception of the print job having the data addition authentication information (password). This elapsed time is measured on the basis of time information which is outputted from the time measuring unit 6.

When a result of the measurement by the elapsed time measuring means 4-1 indicates the elapse of the predetermined time, the erasure extension necessity inquiry means 4-2 transmits a message for requesting the answer about the necessity of the extension of the erasing time from a transmitting source and receives the answer result.

When the answer result of the erasure extension necessity inquiry means 4-2 indicates that the erasure extension is necessary, the erasure/extension decision processing means 4-3 extends the elapsed time until a confidential print job is erased after its reception by a predetermined time. If the answer result indicates that the erasure extension is unnecessary or if there is no answer, the confidential print job is erased.

The operating unit 5 is an operation panel by which the operator who requests the print output of the confidential print job inputs the print request authentication information (password).

The time measuring unit 6 is a timer for outputting the time information when the apparatus is operating.

The print unit 7 is a print engine for print-outputting the confidential print job whose print-output has been admitted among the confidential print jobs received through the input/output I/F unit 1 under the control of the CPU 8.

The CPU 8 is a microprocessor for controlling the whole apparatus by executing the control program which has previously been stored in the ROM 9. Particularly, in the embodiment, the CPU 8 is a portion for activating the attribute managing unit 2 and the erasure extension processing unit 4 by executing the control program which has previously been stored in the ROM 9 in addition to the ordinary control.

The ROM 9 is a read only memory for previously storing the control program which is executed by the CPU 8 to control the whole apparatus. Particularly, in the embodiment, the ROM 9 is a read only memory for previously storing the control program to activate the attribute managing unit 2 and the erasure extension processing unit 4 by the CPU 8 which executes this control program.

The operation of the image forming apparatus 100 described above will now be explained.

First, a sequence for signal transmission and reception between the image forming apparatus 100 (FIG. 1) and the upper apparatus (client PC) 51 will be described.

Figure 2:
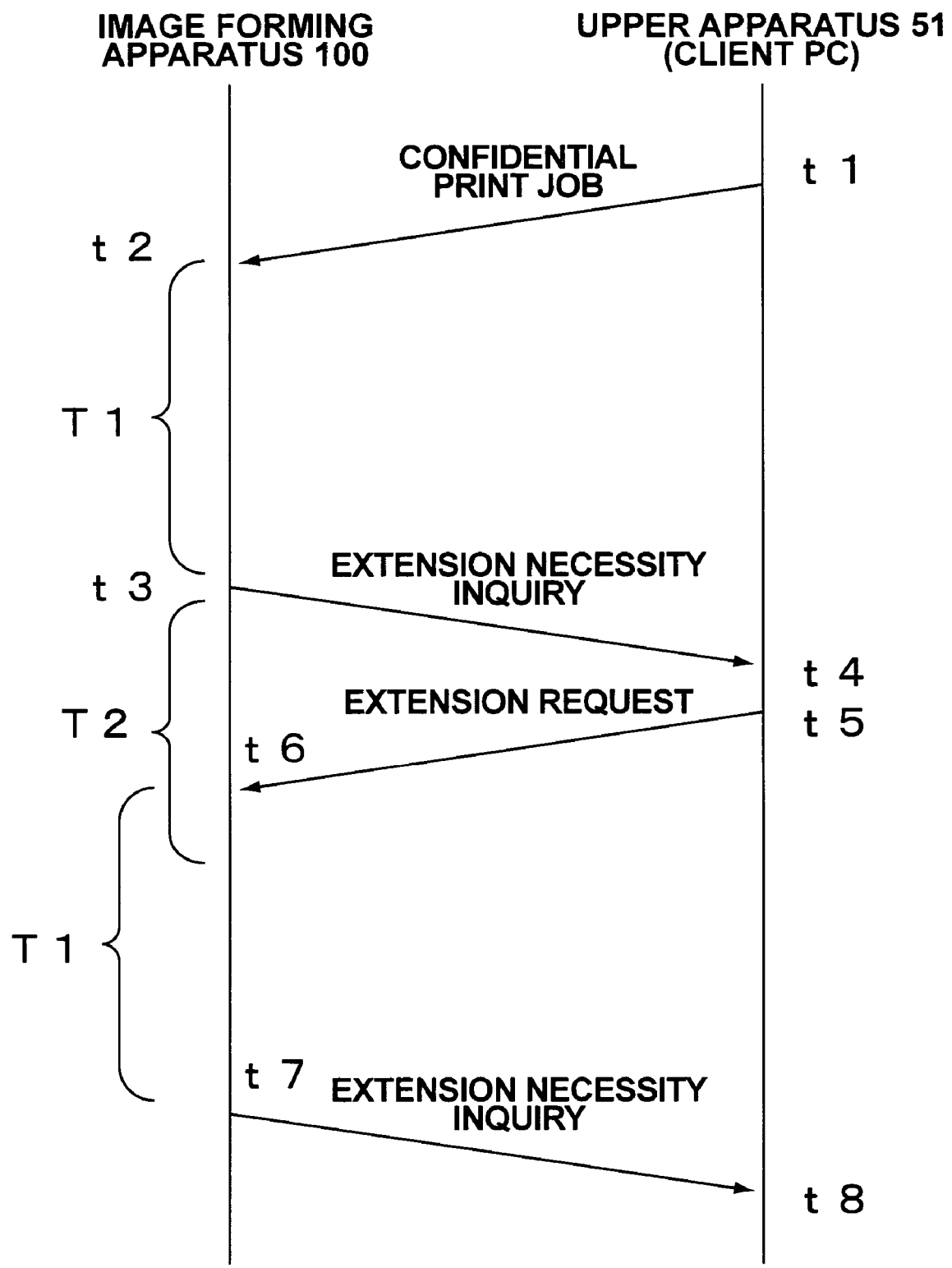
FIG. 2 shows a sequence for extension of a data erasing time.

FIG. 2 shows a sequence for extension of the data erasing time.

In the diagram, the image forming apparatus is arranged on the left side, the upper apparatus is arranged on the right side, and the time elapse is shown from an upper position to a lower position in the diagram.

Time t1:
The upper apparatus 51 transmits the confidential print job to the image forming apparatus 100 through the network.

Time t2:
The image forming apparatus 100 receives the confidential print job.

Time t3:
Since the operator (print output requestor) does not input the print request authentication information (password) even after the elapse of a predetermined time T1, the image forming apparatus 100 transmits an extension necessity inquiry signal to the upper apparatus 51 through the network.

Time t4:
When the upper apparatus 51 receives the extension necessity inquiry signal, it allows an extension necessity confirmation image of the confidential printing to be displayed on an image display unit 51-1 of the upper apparatus 51.

FIG. 3 shows the extension necessity confirmation image of the confidential printing.

As shown in the diagram, as contents to specify the confidential print job, "time", "file", and "the number of pages" are displayed in the extension necessity confirmation image of the confidential printing. A warning showing that this data will be erased after five minutes (after T2) is made. The explanation of the sequence for extension of the data erasing time will be continued while returning to FIG. 2.

Time t5:
When the operator (print output requestor) clicks a check box "Yes" showing that it is necessary to extend the time in the extension necessity confirmation image of the confidential printing (FIG. 3), an extension request signal is transmitted from the upper apparatus 51 to the image forming apparatus 100 through the network.

Time t6:
The image forming apparatus 100 receives the extension request signal. At this time, since the predetermined time T2 does not elapse yet from time t3 when the image forming apparatus 100 transmits the extension necessity inquiry signal, the image forming apparatus 100 extends the predetermined time T1.

Time t7:
Since the operator (print output requester) does not input the print request authentication information (password) even after the elapse of the predetermined time T1, the image forming apparatus 100 transmits the extension necessity inquiry signal to the upper apparatus 51 through the network. Subsequently, a similar sequence is repeated hereinbelow.

Figure 4:
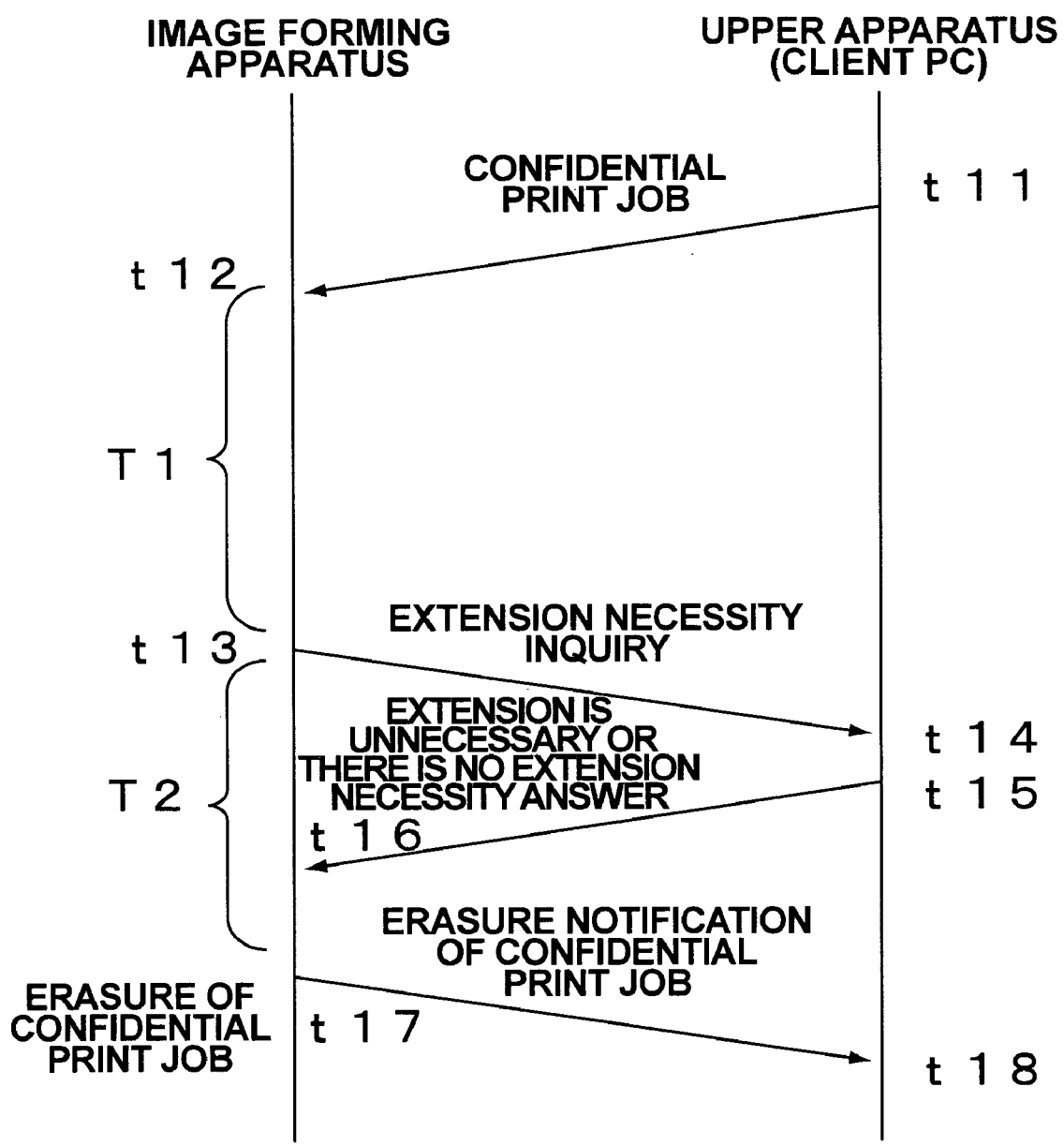
FIG. 4 shows a sequence for erasure of a job.

FIG. 4 shows a sequence for erasure of a job.

In the diagram, the image forming apparatus is arranged on the left side, the upper apparatus is arranged on the right side, and the time elapse is shown from an upper position to a lower position in the diagram.

Time t11:
The upper apparatus 51 transmits the confidential print job to the image forming apparatus 100 through the network.

Time t12:
The image forming apparatus 100 receives the confidential print job.

Time t13:
Since the operator (print output requestor) does not input the print request authentication information (password) even after the elapse of the predetermined time T1, the image forming apparatus 100 transmits the extension necessity inquiry signal to the upper apparatus 51 through the network.

Time t14:
When the upper apparatus 51 receives the extension necessity inquiry signal, it allows the extension necessity confirmation image of the confidential printing (FIG. 3) to be displayed on the image display unit 51-1 of the upper apparatus 51.

Time t15:

When the operator (print output requestor) clicks a check box "No" showing that it is unnecessary to extend the time of the extension necessity confirmation image of the confidential printing (FIG. 3), an extension-unnecessary signal is transmitted from the upper apparatus 51 to the image forming apparatus 100 through the network.

Time t16:

The image forming apparatus 100 receives the extension-unnecessary signal. At this time, since the predetermined time T2 does not elapse yet from time t13 when the image forming apparatus 100 has transmitted the extension necessity inquiry signal, the image forming apparatus 100 continues to hold the confidential print job until the predetermined time T2 elapses.

Time t17:

Since the operator (print output requester) does not input the print request authentication information (password) even after the elapse of the predetermined time T1, the image forming apparatus 100 erases the confidential print job and transmits the erasure notification of the confidential print job through the network.

Time t18:

The upper apparatus 51 receives the erasure notification of the confidential print job and allows an erasure notification image of the confidential print job to be displayed on the image display unit 51-1 of the upper apparatus 51.

FIG. 5 shows the erasure notification image of the confidential print job.

As shown in the diagram, as contents to specify the confidential print job, "time", "file", and "the number of pages" are displayed in the erasure notification image of the confidential print job. A message showing that the data has been erased is displayed. The operator (print output requester) clicks a "clear display" button and the processing sequence is finished.

In the above description, also in the case where the operator (print output requestor) does not make an answer at time t15, a similar process is executed at time t17.

The internal operation of the image forming apparatus and the internal operation of the upper apparatus will now be described.

Figure 6:
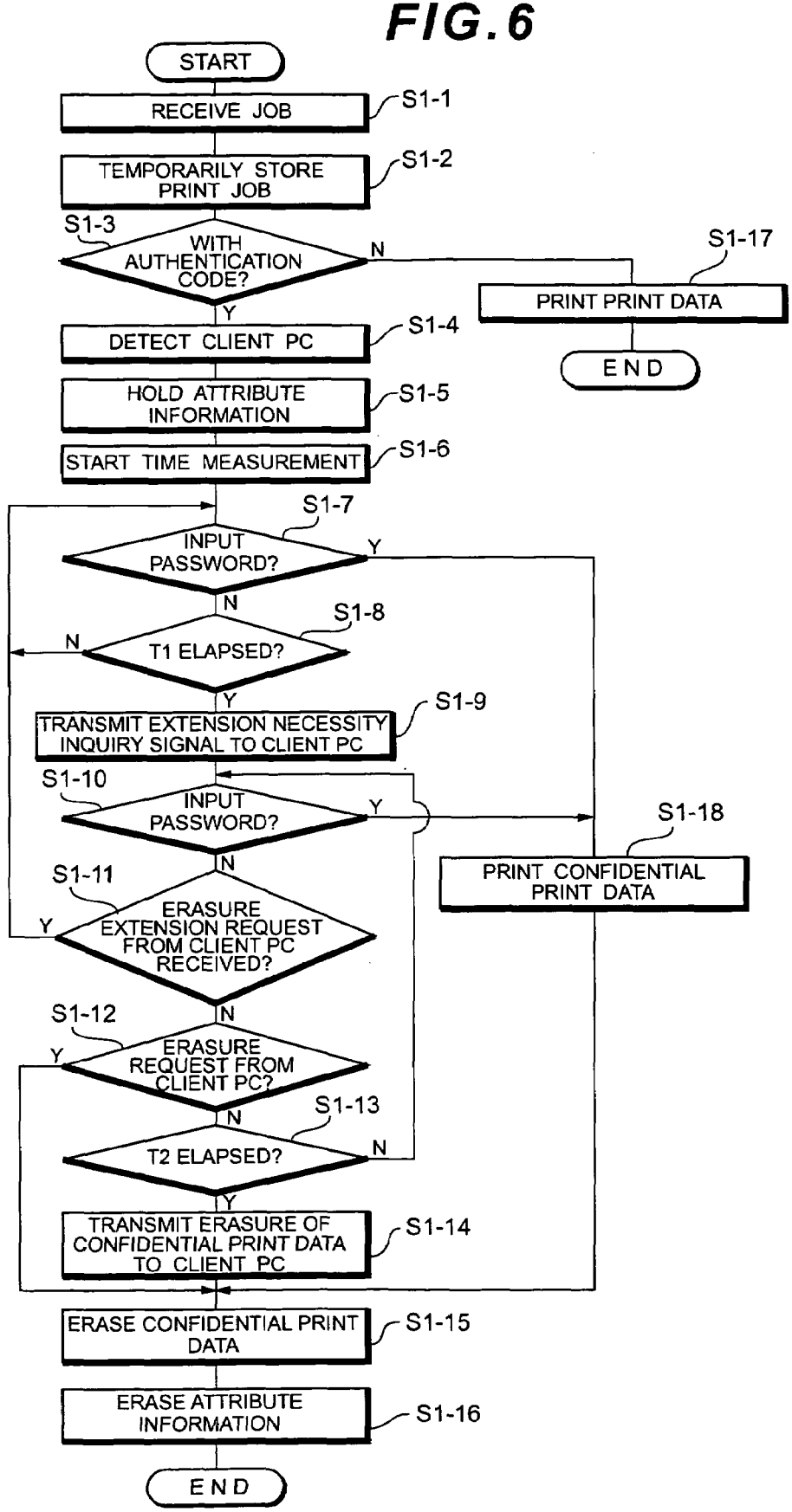
FIG. 6 is a flowchart for explaining the operation of an image forming apparatus in the embodiment 1.

FIG. 6 is a flowchart for explaining the operation of the image forming apparatus in the embodiment 1.

The operation of the image forming apparatus in the embodiment 1 will be described in order of steps S1-1 to S1-18 shown in the flowchart.

Step S1-1

The input/output I/F unit (FIG. 1) receives the print job from the upper apparatus 51 (FIG. 1) through the network. This process corresponds to that at time t2 in FIG. 2.

Step S1-2

The print job is temporarily stored into the confidential data storing area 3-1 (FIG. 1).

Step S1-3

The authentication code detecting means 2-1 (FIG. 1) searches for the data addition authentication information (password). If it cannot be detected, the processing routine advances to step S1-17. If it can be detected, the processing routine advances to step S1-4.

Step S1-4

The upper apparatus specifying means 2-2 (FIG. 1) specifies the client PC from the IP address of the upper apparatus (client PC) 51 (FIG. 1). In this instance, the IP address is used as an example and another address such as a mail address or the like can be also used.

Step S1-5

The data addition authentication information (password) and the IP address of the upper apparatus (client PC) 51 (FIG. 1) are stored into the attribute management information storing area 3-2 (FIG. 1) and managed by the confidential data managing means 2-4 (FIG. 1).

Step S1-6

The elapsed time measuring means 4-1 (FIG. 1) starts the counting operation of the elapsed time.

Step S1-7

The erasure extension necessity inquiry means 4-2 (FIG. 1) monitors the reception of the print request authentication information (password). If it is inputted, step S1-18 follows. If it is not inputted, step S1-8 follows.

Step S1-8

The erasure extension necessity inquiry means 4-2 (FIG. 1) waits until the print request authentication information (password) is inputted within the predetermined time T1, and enters the standby mode while repeating the processes of steps S1-7 and S1-8. When the print request authentication information (password) is inputted within T1, the processing routine advances from step S1-7 to step S1-18. If it is not inputted within T1, step S1-9 follows. A value of T1 is set in consideration of the time interval until the print request authentication information (password) is inputted to the image forming apparatus after the upper apparatus transmitted the confidential print job and the time interval which is required when the operator moves from the upper apparatus to the image forming apparatus in order to input the print request authentication information (password) after the transmission of the extension necessity inquiry signal.

Step S1-9

Since the operator (print output requestor) does not input the print request authentication information (password) even after the elapse of the predetermined time T1, the erasure extension necessity inquiry means 4-2 (FIG. 1) transmits the extension necessity inquiry signal to the upper apparatus 51 through the network. This process corresponds to that at time t3 in FIG. 2.

Step S1-10

The erasure extension necessity inquiry means 4-2 (FIG. 1) enters the standby mode while waiting for the input of the print request authentication information (password). When the print request authentication information (password) is inputted, step S1-18 follows. If it is not inputted, step S1-11 follows.

Step S1-11

If the extension request signal is inputted (this process corresponds to that at time t6 in FIG. 2), the erasure/extension decision processing means 4-3 (FIG. 1) extends the erasing time and the processing routine is returned to step S1-7. The processing loop of steps S1-7 to S1-11 is repeated. If the print request authentication information (password) is inputted during the repetition, the processing routine advances from step S1-7 or S1-10 to step S1-18. If the predetermined time T1 has elapsed again during the repetition, the erasure extension necessity inquiry means 4-2 (FIG. 1) has transmitted the extension necessity inquiry signal to the upper apparatus 51 in step S1-9 (this process corresponds to that at time t7 in FIG. 2), and the extension request signal is inputted again, the erasing time is extended again. If the extension request signal is not inputted during the repetition, step S1-12 follows.

Step S1-12

When the extension-unnecessary signal is inputted (this process corresponds to that at time t16 in FIG. 4), the erasure/extension decision processing means 4-3 (FIG. 1) inquires of said upper apparatus (client PC) whether it is necessary to return the confidential print job as erasure object, then advances to step S1-15. If the extension-unnecessary signal is not inputted, the processing means 4-3 advances to step S1-13.

Step S1-13

The erasure/extension decision processing means 4-3 (FIG. 1) monitors the elapsed time measuring means 4-1. If T2 has elapsed, step S1-14 follows. If it does not elapse, the processing routine is returned to step S1-10 and the processing loop of steps S1-10 to S1-13 is repeated. If the extension-unnecessary signal is inputted during the repetition (erasing request), the processing routine advances from step S1-12 to step S1-15.

Step S1-14

Since the operator (print output requestor) does not input the print request authentication information (password) even after the elapse of the predetermined time T1, the erasure/extension decision processing means 4-3 (FIG. 1) transmits the erasure notification of the confidential print job through the network. This process corresponds to that at time t17 in FIG. 4.

Step S1-15

In the case that there is an answer having no necessity to return the confidential print job as erasure object to the upper apparatus, as an inquiry result after inquired the upper apparatus in S1-12, the erasure/extension decision processing means 4-3 (FIG. 1) erases the confidential print job from the confidential data storing area 3-1 (FIG. 1).

Also, in the case that there is an answer to return the confidential print job as erasure object to the upper apparatus, as an inquiry result after inquired the upper apparatus in S1-12, the erasure/extension decision processing means 4-3 (FIG. 1) sends the confidential print job as erasure object to the upper apparatus in the image forming apparatus, then erases the confidential print job from the confidential data storing area 3-1 (FIG. 1).

Moreover, the upper apparatus (client PC) may requests a print request once more by sending again the returned confidential print job having become an erasure object to the image forming apparatus.

Step S1-16

The erasure/extension decision processing means 4-3 (FIG. 1) erases the corresponding confidential data attribute management information from the attribute management information storing area 3-2 (FIG. 1) and finishes the processing routine.

Step S1-17

Since the print job is a job corresponding to the ordinary printing process, the print unit 7 (FIG. 1) print-outputs the print data and finishes the processing routine.

Step S1-18

When the collating means 2-3 (FIG. 1) confirms that the data addition authentication information (password) and the print request authentication information (password) coincide, the print unit 7 (FIG. 1) receives the storage address of the confidential print job from the confidential data managing means 2-4 (FIG. 1) and print-outputs the print job. Then, the processing routine advances to steps S1-15 and S1-16 and is finished.

Figure 7:
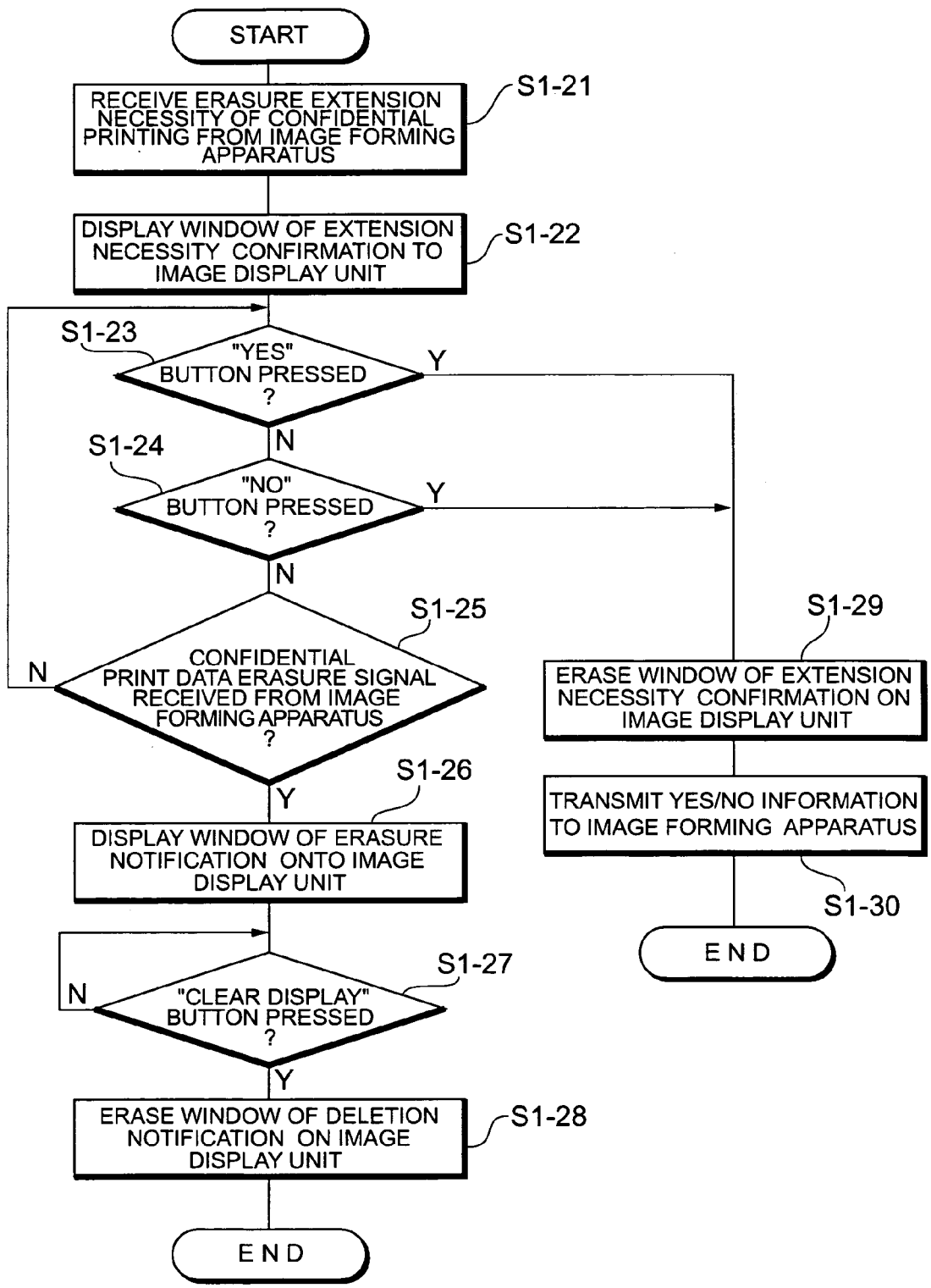
FIG. 7 is a flowchart for explaining the operation of an upper apparatus in the embodiment 1.

FIG. 7 is a flowchart for explaining the operation of the upper apparatus in the embodiment 1.

The operation of the upper apparatus in the embodiment 1 will now be described in order of steps S1-21 to S1-28 shown in the flowchart.

Step S1-21

A control unit 51-2 (FIG. 1) receives the extension necessity inquiry signal from the image forming apparatus 100 (FIG. 1) through an input/output unit 51-3 (FIG. 1).

Step S1-22

The control unit 51-2 (FIG. 1) allows the extension necessity confirmation image (FIG. 3) of the confidential printing to be displayed on an image display unit 51-1 (FIG. 1). This process corresponds to that at time t4 in FIG. 2 or time t14 in FIG. 4.

Step S1-23

When the operator clicks or presses the check box "Yes" (FIG. 3), step S1-29 follows. If he does not click or press it, step S1-24 follows.

Step S1-24

When the operator clicks or presses the check box "No" (FIG. 3), step S1-29 follows. If he does not click or press it, step S1-25 follows.

Step S1-25

Since the operator does not made a response, after the elapse of the predetermined time T1, the input/output unit 51-3 (FIG. 1) receives the erasure notification of the confidential print job from the image forming apparatus 100 (FIG. 1) through the network. This process corresponds to that at time t18 in FIG. 4.

Step S1-26

The control unit 51-2 (FIG. 1) allows the erasure notification image (FIG. 5) of the confidential print job to be displayed on the image display unit 51-1 (FIG. 1).

Step S1-27

The operator clicks or presses the "clear display" button and advances to the next processing step. This process corresponds to that at time t18 in FIG. 4.

Step S1-28

The control unit 51-2 (FIG. 1) erases the erasure notification image (FIG. 5) of the confidential print job from the image display unit 51-1 (FIG. 1) and the processing routine is finished.

Step S1-29

The control unit 51-2 (FIG. 1) erases the extension necessity confirmation image of the confidential printing (FIG. 3) from the image display unit 51-1 (FIG. 1) and advances to the next step.

Step S1-30

The control unit 51-2 (FIG. 1) transmits the answer result about the extension necessity to the image forming apparatus and the processing routine is finished. This process corresponds to that at time t5 in FIG. 2 or time t15 in FIG. 4.

As described above, according to the embodiment, when the measurement result of the elapsed time measuring means indicates the elapse of the predetermined time, the erasure extension necessity inquiry means requests the answer result about the necessity of the extension of the erasing time from the transmitting source. When the answer result indicates that the erasure extension is necessary, the elapsed time until the print job is erased after its reception is extended. Therefore, there is obtained an effect that even if the predetermined time has elapsed due to some situation until the operator inputs the password into the image forming apparatus, he doesn't need to repetitively transmit the print job again.

Embodiment 2

According to the embodiment, a case where the print output becomes impossible due to maintenance of the image forming apparatus or the occurrence of the abnormal state by a recording paper jam is presumed, and in such a case, the progress of the elapsed time until the confidential print job is erased after its reception is substantially stopped by a time T3 until the abnormal state is recovered from its occurrence.

Figure 8:
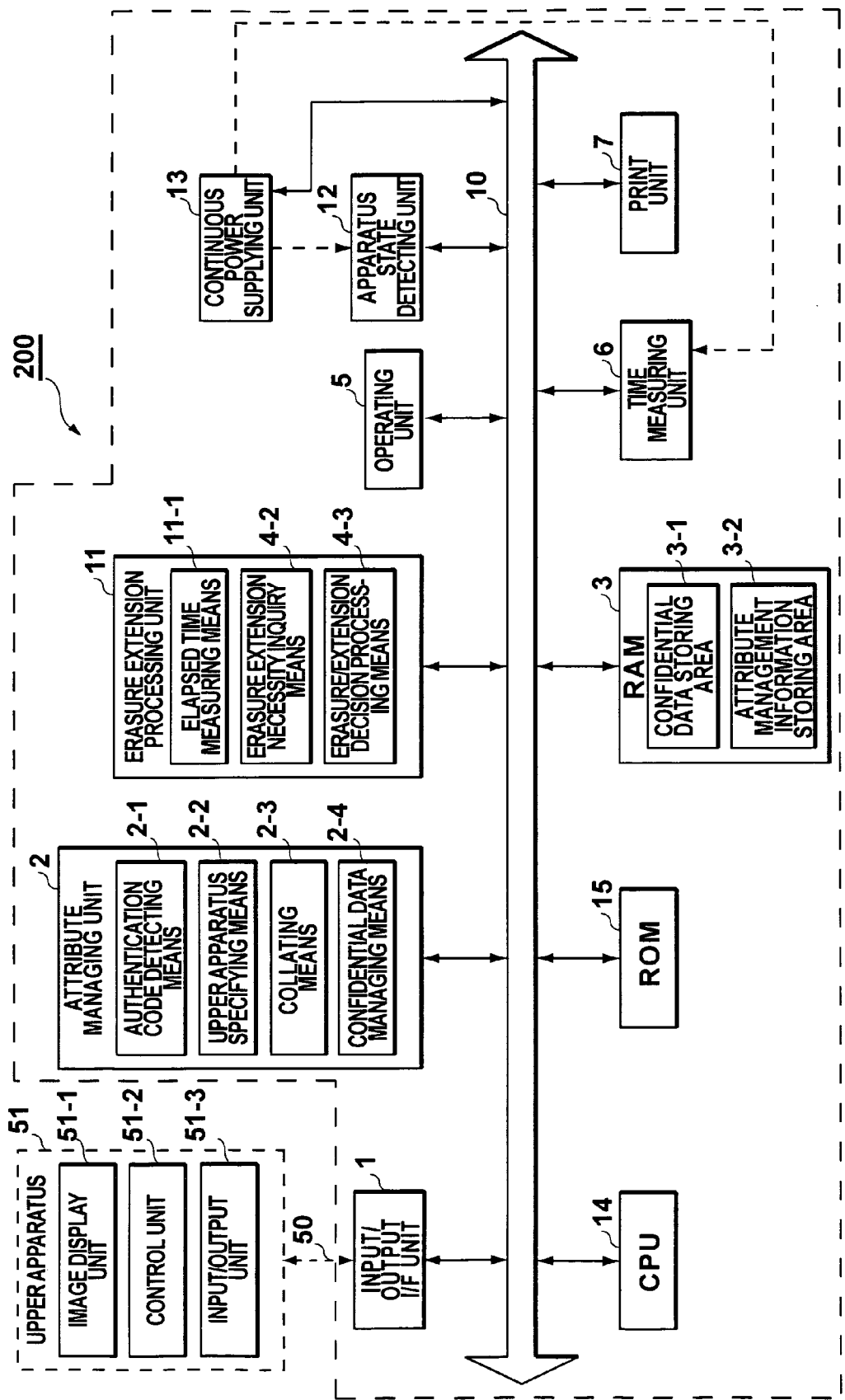
FIG. 8 is a block diagram showing a construction of the embodiment 2.

FIG. 8 is a block diagram showing a construction of the embodiment 2.

As shown in the diagram, an image forming apparatus 200 of the embodiment 2 comprises: the input/output I/F unit 1; the attribute managing unit 2; the RAM 3; the operating unit 5; the time measuring unit 6; the print unit 7; the common bus 10; an erasure extension processing unit 11; an apparatus state detecting unit 12; a continuous power supplying unit 13; a CPU 14; and a ROM 15. Only portions different from those in the embodiment 1 will be described hereinbelow. Portions similar to those in the embodiment 1 are designated by the same reference numerals as those in the embodiment 1 and their description is omitted.

The erasure extension processing unit 11 has therein: elapsed time measuring means 11-1; the erasure extension necessity inquiry means 4-2; and the erasure/extension decision processing means 4-3. When a predetermined time elapses from the reception of the confidential print job, the erasure extension processing unit 11 requests an answer about the necessity of the extension of the erasing time from the transmitting source. If a result of the answer indicates that the erasure extension is necessary, the elapsed time until the print job is erased after its reception is extended. If the answer result indicates that the erasure extension is unnecessary or if there is no answer, the confidential print job is erased. Further, when an abnormal state occurs in the apparatus, the progress of the elapsed time until the print job is erased after its reception is stopped by a time until the abnormal state is recovered from its occurrence and T1 and T2 described in the embodiment 1 are measured. The erasure extension processing unit 11 is means which is activated by the CPU 14 which executes a predetermined control program which has previously been stored in the ROM 15.

The elapsed time measuring means 11-1 measures the elapsed time from the reception of the print job having the data addition authentication information (password). This elapsed time is measured on the basis of the time information which is outputted from the time measuring unit 6. Further, when the abnormal state occurs in the apparatus, the progress of the elapsed time after the print job was received is stopped by a time (T3) until the abnormal state is recovered from its occurrence and T1 and T2 described in the embodiment 1 are measured.

The apparatus state detecting unit 12 is a portion for monitoring the occurrence and recovery of the abnormal state in the apparatus and measuring the time T3 until the abnormal state is recovered after its occurrence. The abnormal state denotes a state where the printing becomes impossible due to, for example, the paper jam or the like. This portion is means which is activated by the CPU 14 which executes the predetermined control program which has previously been stored in the ROM 15.

The continuous power supplying unit 13 is a portion for supplying a power source to the time measuring unit 6 even when a main power source (not shown) of the apparatus is OFF, thereby enabling time information to be continuously obtained. A chargeable battery is ordinarily used and it is assumed that when the main power source of the apparatus is ON, the charging is executed.

The CPU 14 is a microprocessor for controlling the whole apparatus by executing the control program which has previously been stored in the ROM 15. Particularly, in the embodiment 2, the CPU 14 is a portion for activating the erasure extension processing unit 11 and the apparatus state detecting unit 12 by executing the control program which has previously been stored in the ROM 15 in addition to the control in the embodiment 1.

The ROM 15 is a read only memory for previously storing the control program to control the whole apparatus by the CPU 14 which executes this control program. Particularly, in the embodiment, the ROM 15 is a read only memory for previously storing the control program to activate the erasure extension processing unit 11 and the apparatus state detecting unit 12 by the CPU 14 which executes this control program in addition to the control program which is stored in the embodiment 1.

The operation of the image forming apparatus 200 described above will now be explained.

Since a sequence for signal transmission and reception between the image forming apparatus 200 (FIG. 8) and the upper apparatus 51 (FIG. 8) and the operation of the upper apparatus 51 (FIG. 8) are similar to those in the embodiment 1, their description is omitted and only the operation of the image forming apparatus 200 (FIG. 8) will be described.

Figure 9:
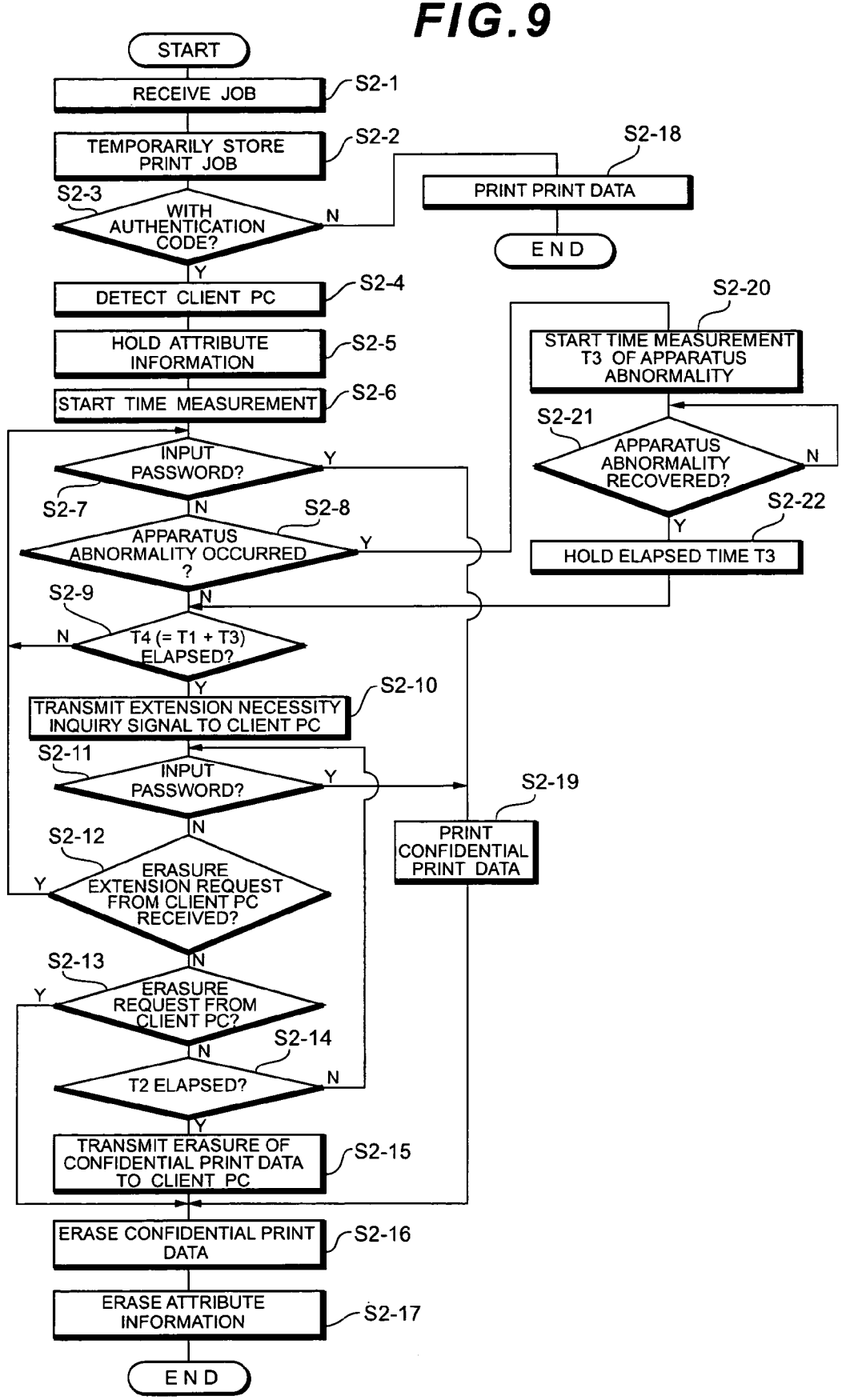
FIG. 9 is a flowchart for explaining the operation of an image forming apparatus in the embodiment 2.

FIG. 9 is a flowchart for explaining the operation of the image forming apparatus in the embodiment 2.

The operation of the image forming apparatus in the embodiment 2 will be described in order of steps S2-1 to S2-22 shown in the flowchart.

Step S2-1

The input/output I/F unit (FIG. 8) receives the print job from the upper apparatus 51 (FIG. 8) through the network. This process corresponds to that at time t2 in FIG. 2.

Step S2-2

The print job is temporarily stored in the confidential data storing area 3-1 (FIG. 8).

Step S2-3

The authentication code detecting means 2-1 (FIG. 8) searches for the data addition authentication information (password). If it cannot be detected, step S2-18 follows. If it can be detected, step S2-4 follows.

Step S2-4

The upper apparatus specifying means 2-2 (FIG. 8) specifies the client PC from the IP address of the upper apparatus (client PC) 51 (FIG. 8). In this instance, the IP address is used as an example and another address such as a mail address or the like can be also used.

Step S2-5

The data addition authentication information (password) and the IP address of the upper apparatus (client PC) 51 (FIG. 8) are stored into the attribute management information storing area 3-2 (FIG. 8) and managed by the confidential data managing means 2-4 (FIG. 8).

Step S2-6

The elapsed time measuring means 11-1 (FIG. 8) starts the counting operation of the elapsed time.

Step S2-7

The erasure extension necessity inquiry means 4-2 (FIG. 8) monitors the reception of the print request authentication information (password). If it is inputted, step S2-19 follows. If it is not inputted, step S2-8 follows.

Step S2-8

When the apparatus state detecting unit 12 (FIG. 8) detects the abnormal state, step S2-20 follows. If the abnormal state is not detected, step S2-9 follows.

Step S2-9

The erasure extension necessity inquiry means 4-2 (FIG. 8) waits until the print request authentication information (password) is inputted within a predetermined time T4 and enters the standby mode while repeating the processes of steps S2-7, S2-8, S2-20, S2-21, S2-22, S2-9, and S2-7. When the print request authentication information (password) is inputted within T4, the processing routine advances from step S2-7 to step S2-19. If it is not inputted within T4 (=T1+T3), step S2-10 follows. The value of T1 is set in consideration of the time interval until the print request authentication information (password) is inputted to the image forming apparatus after the upper apparatus transmitted the confidential print job and the time interval which is required when the operator moves from the upper apparatus to the image forming apparatus in order to input the print request authentication information (password) after the transmission of the extension necessity inquiry signal. Further, T3 denotes an elapsed time until the abnormal state is recovered after the apparatus state detecting unit 12 detected the abnormal state.

Step S2-10

Since the operator (print output requester) does not input the print request authentication information (password) even after the elapse of the predetermined time T4, the erasure extension necessity inquiry means 4-2 (FIG. 8) transmits the extension necessity inquiry signal to the upper apparatus 51 through the network. This process corresponds to that at time t3 in FIG. 2.

Step S2-11

The erasure extension necessity inquiry means 4-2 (FIG. 8) enters the standby mode while waiting for the input of the print request authentication information (password). When the print request authentication information (password) is inputted, step S2-19 follows. If it is not inputted, step S2-12 follows.

Step S2-12

If the extension request signal is inputted (this process corresponds to that at time t6 in FIG. 2), the erasure/extension decision processing means 4-3 (FIG. 8) extends the erasing time and the processing routine is returned to step S2-7. The processing loop of steps S2-7 to S2-12 (steps S2-20 to S2-22 are included between steps S2-8 and S2-9) is repeated. If the print request authentication information (password) is inputted during the repetition, the processing routine advances from step S2-7 or S2-11 to step S2-19. If the predetermined time T4 has elapsed again during the repetition, the erasure extension necessity inquiry means 4-2 (FIG. 8) has transmitted the extension necessity inquiry signal to the upper apparatus 51 in step S2-10 (this process corresponds to that at time t7 in FIG. 2), and the extension request signal is inputted again, the erasing time is extended again. If the extension request signal is not inputted during the repetition, step S2-13 follows.

Step S2-13

When the extension-unnecessary signal is inputted (this process corresponds to that at time t16 in FIG. 4), the erasure/extension decision processing means 4-3 (FIG. 8) advances to step S2-16. If the extension-unnecessary signal is not inputted, the processing means 4-3 advances to step S2-14.

Step S2-14

The erasure/extension decision processing means 4-3 (FIG. 8) monitors the elapsed time measuring means 11-1. If T2 has elapsed, step S2-15 follows. If it does not elapse, the processing routine is returned to step S2-11 and the processing loop of steps S2-11 to S2-14 is repeated. If the extension-unnecessary signal is inputted during the repetition (erasing request), the processing routine advances from step S2-13 to step S2-16.

Step S2-15

Since the operator (print output requestor) does not input the print request authentication information (password) even after the elapse of the predetermined time T4, the erasure/extension decision processing means 4-3 (FIG. 8) transmits the erasure notification of the confidential print job through the network. This process corresponds to that at time t17 in FIG. 4.

Step S2-16

The erasure/extension decision processing means 4-3 (FIG. 8) erases the confidential print job from the confidential data storing area 3-1 (FIG. 8).

Step S2-17

The erasure/extension decision processing means 4-3 (FIG. 8) erases the corresponding confidential data attribute management information from the attribute management information storing area 3-2 (FIG. 8) and finishes the processing routine.

Step S2-18

Since the print job is a job corresponding to the ordinary printing process, the print unit 7 (FIG. 8) print-outputs the print data and finishes the processing routine.

Step S2-19

When the collating means 2-3 (FIG. 8) confirms that the data addition authentication information (password) and the print request authentication information (password) coincide, the print unit 7 (FIG. 8) receives the storage address of the confidential print job from the confidential data managing means 2-4 (FIG. 8) and print-outputs the print data. Then, the processing routine advances to steps S2-16 and S2-17 and is finished.

Step S2-20

The apparatus state detecting unit 12 (FIG. 8) starts the counting operation of the elapsed time (T3) from the occurrence of the abnormal state.

Step S2-21

The apparatus state detecting unit 12 (FIG. 8) waits for the recovery of the abnormal state while measuring the elapsed time (T3) from the occurrence of the abnormal state.

Step S2-22

The apparatus state detecting unit 12 (FIG. 8) detects the recovery of the abnormal state, holds the elapsed time T3, and advances to step S2-9. T4 is calculated on the basis of the elapsed time T3, the subsequent processing steps are executed, and thereafter, the processing routine is finished.

As described above, according to the embodiment, in the case where the print output becomes impossible due to the maintenance of the image forming apparatus or the occurrence of the abnormal state by the recording paper jam, the progress of the elapsed time until the print job is erased after its reception is substantially stopped by the time T3 during which the print output is impossible. Therefore, an effect that the confidential print job is not erased for the time during which the print output is impossible and, further, it is unnecessary to inquire about the necessity confirmation for a period of time until the erasure of the confidential print job is obtained.

Embodiment 3

According to the embodiment 3, it is assumed that when the number of repetition times reaches a predetermined number, the extension is not requested to the upper apparatus which repetitively requests the extension of the time until the confidential print job is deleted, and the corresponding confidential print job and its attribute management information are erased from the RAM.

Figure 10:
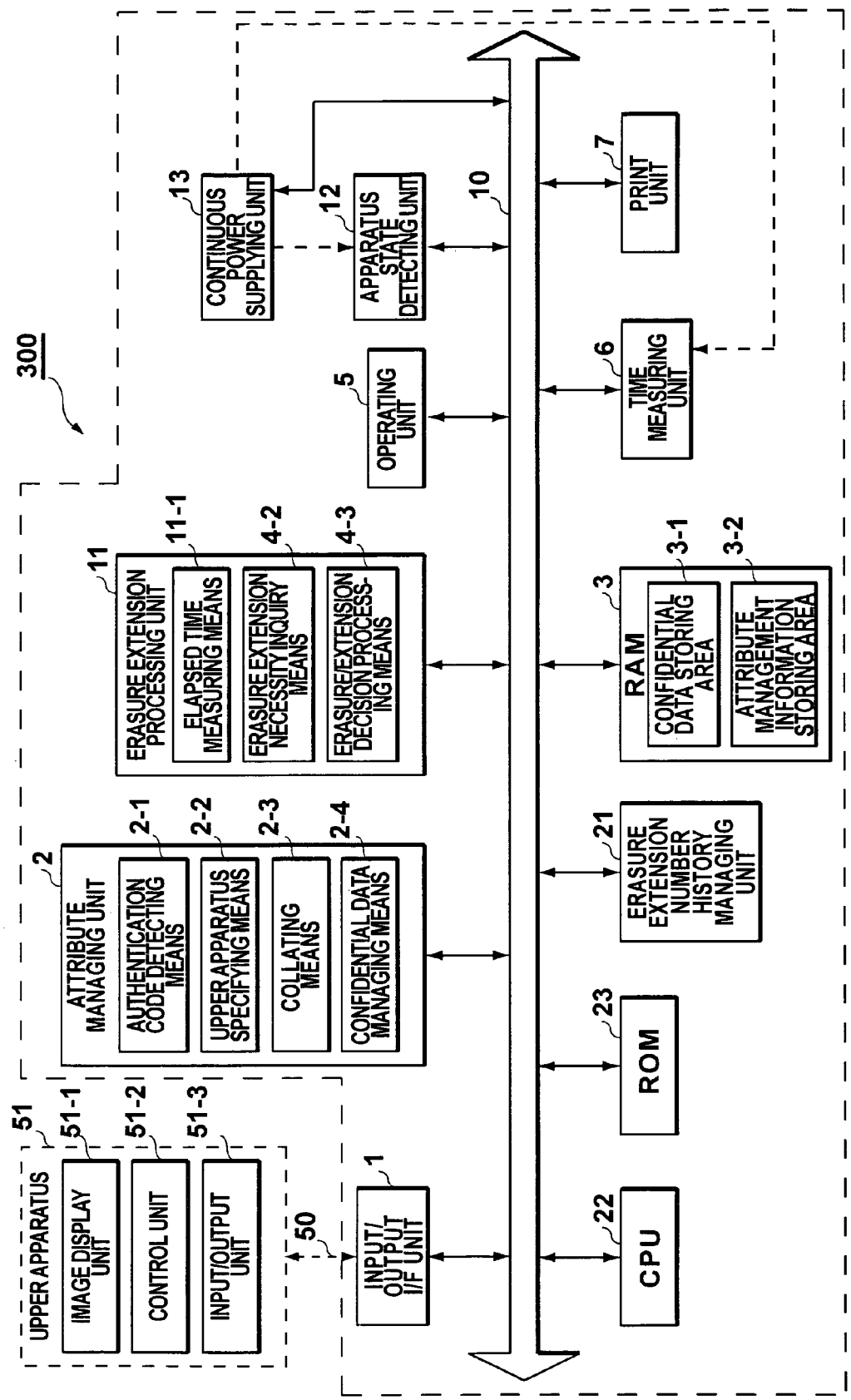
FIG. 10 is a block diagram showing a construction of the embodiment 3.

FIG. 10 is a block diagram showing a construction of the embodiment 3.

As shown in the diagram, an image forming apparatus 300 of the embodiment 3 comprises: the input/output I/F unit 1; the attribute managing unit 2; the RAM 3; the operating unit 5; the time measuring unit 6; the print unit 7; the common bus 10; the erasure extension processing unit 11; the apparatus state detecting unit 12; the continuous power supplying unit 13; an erasure extension number history managing unit 21; a CPU 22; and a ROM 23. Only portions different from those in the embodiment 1 or 2 will be described hereinbelow. Portions similar to those in the embodiment 1 or 2 are designated by the same reference numerals as those in the embodiment 1 or 2 and their description is omitted.

The erasure extension number history managing unit 21 is a portion for managing the number of repetition times of the extension of the time until the deletion of the confidential print job, and if the number of repetition times reaches the predetermined number, inhibiting the upper apparatus 51 from requesting the extension to and erasing the corresponding confidential print job and its attribute management information from the RAM 3. This portion is means which is activated by the CPU 22 which executes a predetermined control program which has previously been stored in the ROM 23.

The CPU 22 is a microprocessor for controlling the whole apparatus by executing the control program which has previously been stored in the ROM 23. Particularly, in the embodiment 3, the CPU 22 is a portion for activating the erasure extension number history managing unit 21 by executing the control program which has previously been stored in the ROM 23 in addition to the control in the embodiment 2.

The ROM 23 is a read only memory for previously storing the control program which is executed by the CPU 22 to control the whole apparatus. Particularly, in the embodiment, the ROM 23 is a read only memory for previously storing the control program to activate the erasure extension number history managing unit 21 by the CPU 22 which executes this control program.

The operation of the image forming apparatus 300 described above will now be explained.

Since a sequence for signal transmission and reception between the image forming apparatus 300 (FIG. 10) and the upper apparatus 51 (FIG. 10) and the operation of the upper apparatus 51 (FIG. 10) are similar to those in the embodiment 1 or 2, their description is omitted and only the operation of the image forming apparatus 300 (FIG. 10) will be described.

Figure 11:
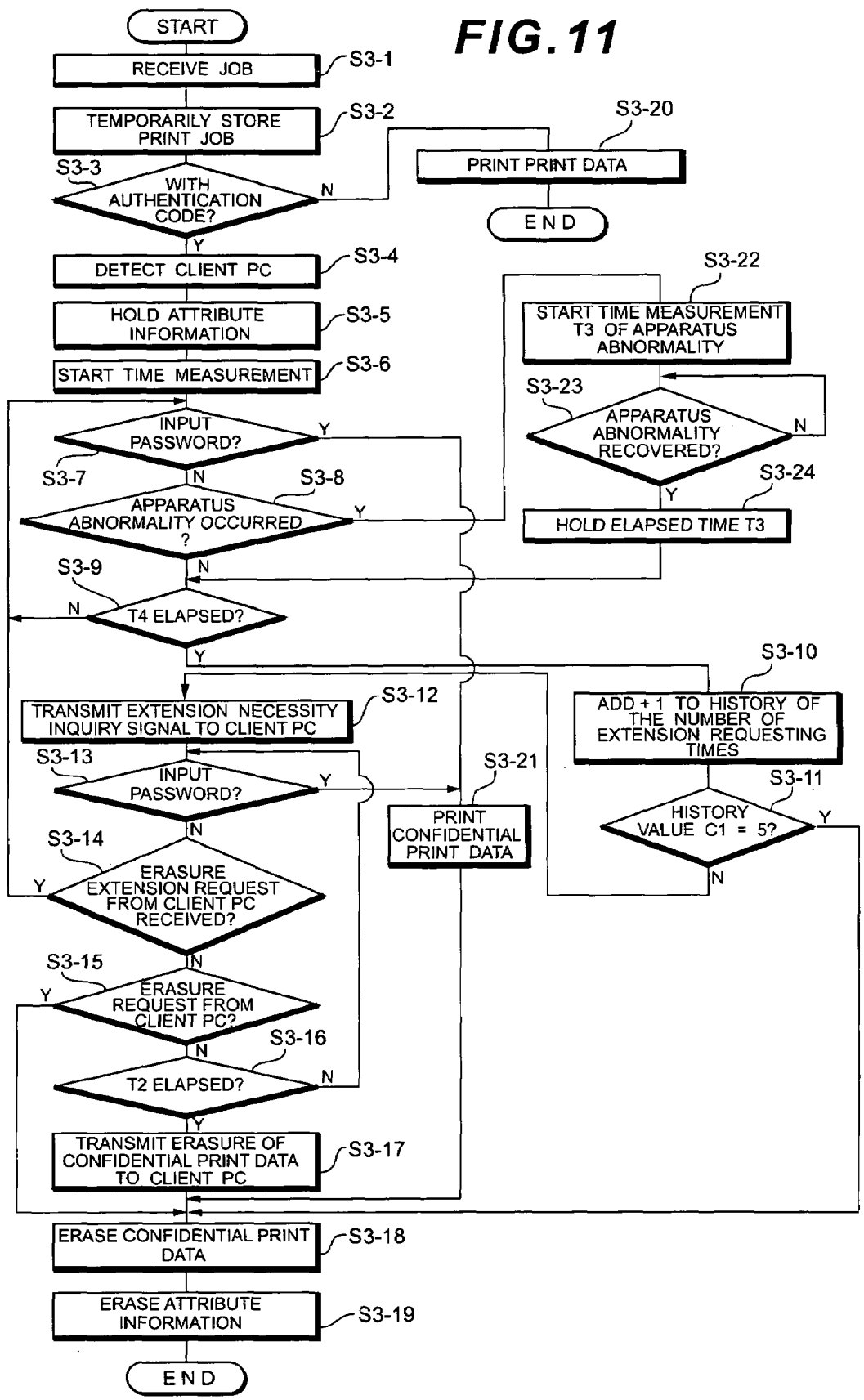
FIG. 11 is a flowchart for explaining the operation of an image forming apparatus in the embodiment 3.

FIG. 11 is a flowchart for explaining the operation of the image forming apparatus in the embodiment 3.

The operation of the image forming apparatus in the embodiment 3 will be described in order of steps S3-1 to S3-24 shown in the flowchart.

Step S3-1

The input/output I/F unit (FIG. 10) receives the print job from the upper apparatus 51 (FIG. 10) through the network. This process corresponds to that at time t2 in FIG. 2.

Step S3-2

The print job is temporarily stored in the confidential data storing area 3-1 (FIG. 10).

Step S3-3

The authentication code detecting means 2-1 (FIG. 10) searches for the data addition authentication information (password). If it cannot be detected, step S3-20 follows. If it can be detected, step S3-4 follows.

Step S3-4

The upper apparatus specifying means 2-2 (FIG. 10) specifies the client PC from the IP address of the upper apparatus (client PC) 51 (FIG. 10). In this instance, the IP address is used as an example and another address such as a mail address or the like can be also used.

Step S3-5

The data addition authentication information (password) and the IP address of the upper apparatus (client PC) 51 (FIG. 10) are stored into the attribute management information storing area 3-2 (FIG. 10) and managed by the confidential data managing means 2-4 (FIG. 10).

Step S3-6

The elapsed time measuring means 11-1 (FIG. 10) starts the counting operation of the elapsed time.

Step S3-7

The erasure extension necessity inquiry means 4-2 (FIG. 10) monitors the reception of the print request authentication information (password). If it is inputted, step S3-21 follows. If it is not inputted, step S3-8 follows.

Step S3-8

When the apparatus state detecting unit 12 (FIG. 10) detects the abnormal state, step S3-22 follows. If the abnormal state is not detected, step S3-9 follows.

Step S3-9

The erasure extension necessity inquiry means 4-2 (FIG. 10) waits until the print request authentication information (password) is inputted within the predetermined time T4 and enters the standby mode while repeating the processes of steps S3-7, S3-8, S3-22, S3-23, S3-24, S3-9, and S3-7. When the print request authentication information (password) is inputted within T4, the processing routine advances from step S3-7 to step S3-21. If it is not inputted within T4 (=T1+T3), step S3-10 follows. The value of T1 is set in consideration of the time interval until the print request authentication information (password) is inputted to the image forming apparatus after the upper apparatus transmitted the confidential print job and the time interval which is required when the operator moves from the upper apparatus to the image forming apparatus in order to input the print request authentication information (password) after the transmission of the extension necessity inquiry signal. Further, T3 denotes the elapsed time until the abnormal state is recovered after the apparatus state detecting unit 12 detected the abnormal state.

Step S3-10

The erasure extension number history managing unit 21 (FIG. 10) adds "1" to the number of erasure extension times.

Step S3-11

When a history of the number of erasure extension times reaches a history value C1 (for example, 5), the erasure extension number history managing unit 21 (FIG. 10) advances to step S3-18. If it does not reach the history value C1, the managing unit 21 advances to step S3-12.

Step S3-12

Since the operator (print output requestor) does not input the print request authentication information (password) even after the elapse of the predetermined time T4, the erasure extension necessity inquiry means 4-2 (FIG. 10) transmits the extension necessity inquiry signal to the upper apparatus 51 (FIG. 10) through the network. This process corresponds to that at time t3 in FIG. 2.

Step S3-13

The erasure extension necessity inquiry means 4-2 (FIG. 10) enters the standby mode while waiting for the input of the print request authentication information (password). When the print request authentication information (password) is inputted, step S3-21 follows. If it is not inputted, step S3-14 follows.

Step S3-14

If the extension request signal is inputted (this process corresponds to that at time t6 in FIG. 2), the erasure/extension decision processing means 4-3 (FIG. 10) extends the erasing time and the processing routine is returned to step S3-7. The processing loop of steps S3-7 to S3-14 (steps S3-22 to S3-24 are included between steps S3-8 and S3-9) is repeated. If the print request authentication information (password) is inputted during the repetition, the processing routine advances from step S3-7 or S3-13 to step S3-21. If the predetermined time T4 has elapsed again during the repetition, the erasure extension necessity inquiry means 4-2 (FIG. 10) has transmitted the extension necessity inquiry signal to the upper apparatus 51 (FIG. 10) in step S3-12 (this process corresponds to that at time t7 in FIG. 2), and the extension request signal is inputted again, the erasing time is extended again. If the history of the number of erasure extension times reaches the history value C1 (for example, 5) during the repetition, step S3-18 follows. If the extension request signal is not inputted during the repetition, step S3-15 follows.

Step S3-15

When the extension-unnecessary signal is inputted (this process corresponds to that at time t16 in FIG. 4), the erasure/extension decision processing means 4-3 (FIG. 10) advances to step S3-18. If the extension-unnecessary signal is not inputted, the processing means 4-3 advances to step S3-16.

Step S3-16

The erasure/extension decision processing means 4-3 (FIG. 10) monitors the elapsed time measuring means 11-1. If T2 has elapsed, step S3-17 follows. If it does not elapse, the processing routine is returned to step S3-13 and the processing loop of steps S3-13 to S3-16 is repeated. If the extension-unnecessary signal is inputted during the repetition (erasing request), the processing routine advances to step S3-18.

Step S3-17

Since the operator (print output requestor) does not input the print request authentication information (password) even after the elapse of the predetermined time T4, the erasure/extension decision processing means 4-3 (FIG. 10) transmits the erasure notification of the confidential print job through the network. This process corresponds to that at time t17 in FIG. 4.

Step S3-18

The erasure/extension decision processing means 4-3 (FIG. 10) erases the confidential print job from the confidential data storing area 3-1 (FIG. 10).

Step S3-19

The erasure/extension decision processing means 4-3 (FIG. 10) erases the corresponding confidential data attribute management information from the attribute management information storing area 3-2 (FIG. 10) and finishes the processing routine.

Step S3-20

Since the print job is a job corresponding to the ordinary printing process, the print unit 7 (FIG. 10) print-outputs the print data and finishes the processing routine.

Step S3-21

When the collating means 2-3 (FIG. 10) confirms that the data addition authentication information (password) and the print request authentication information (password) coincide, the print unit 7 (FIG. 10) receives the storage address of the confidential print job from the confidential data managing means 2-4 (FIG. 10) and print-outputs the print data. Then, the processing routine advances to steps S3-18 and S3-19 and is finished.

Step S3-22

The apparatus state detecting unit 12 (FIG. 10) starts the counting operation of the elapsed time (T3) from the occurrence of the abnormal state.

Step S3-23

The apparatus state detecting unit 12 (FIG. 10) waits for the recovery of the abnormal state while measuring the elapsed time (T3) from the occurrence of the abnormal state.

Step S3-24

The apparatus state detecting unit 12 (FIG. 10) detects the recovery of the abnormal state, holds the elapsed time T3, and advances to step S3-9. Further, T4 is calculated on the basis of the elapsed time T3, the subsequent processing steps are executed, and thereafter, the processing routine is finished.

As described above, according to the embodiment, as for the upper apparatus 51 which repetitively requests the extension of the time until the deletion of the confidential print job, in the case where the number of repetition times reaches the predetermined number, the extension request is not made to the upper apparatus 51 but the corresponding print data and its attribute management information are erased from the RAM 3. Thus, an effect that a storage capacity of the RAM 3 can be reduced is obtained.

Embodiment 4

According to the embodiment 4, the extension necessity request of the confidential print job can be received from the upper apparatus (upper apparatus other than the upper apparatus which has transmitted the confidential print job).

Figure 12:
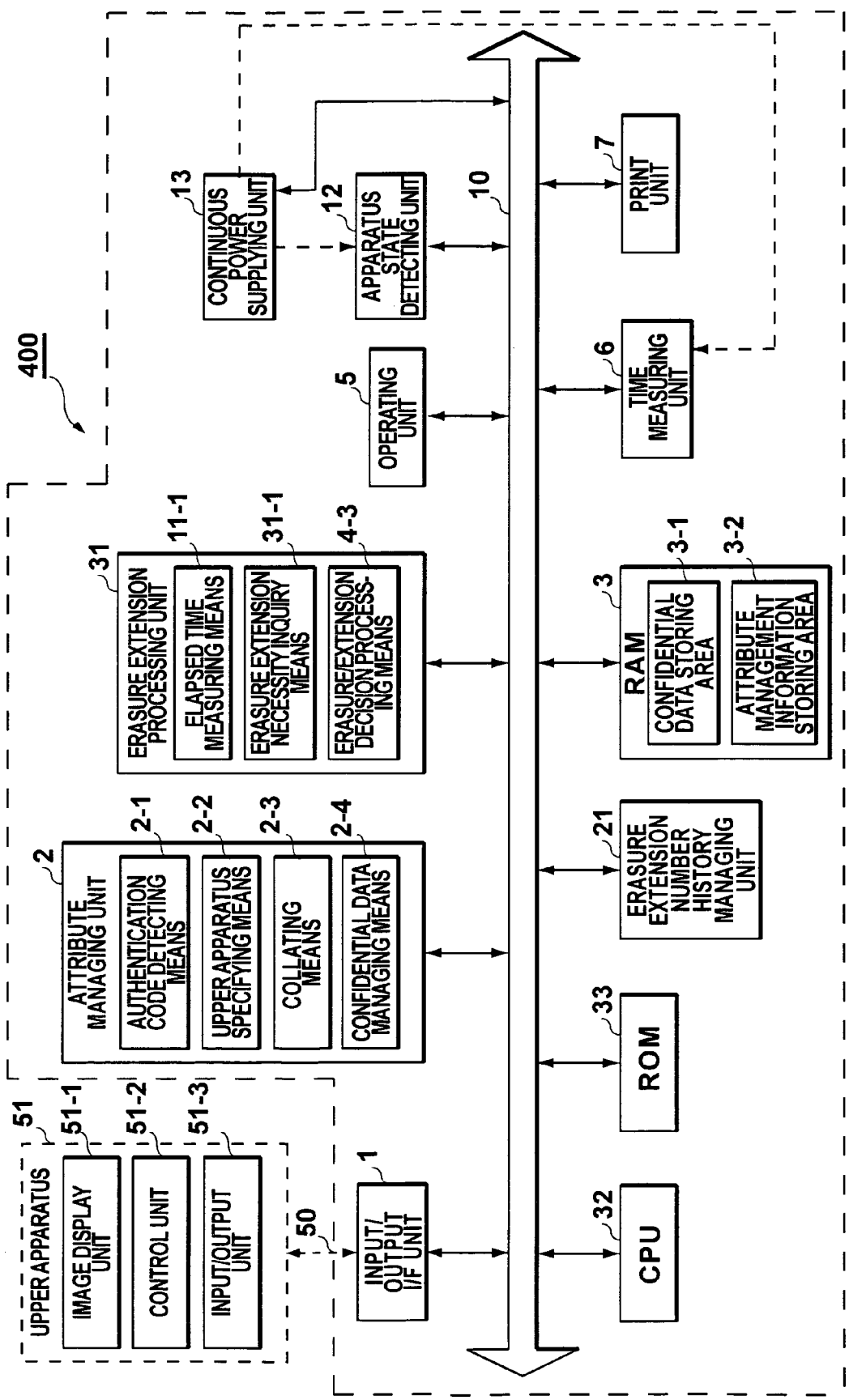
FIG. 12 is a block diagram showing a construction of the embodiment 4.

FIG. 12 is a block diagram showing a construction of the embodiment 4.

As shown in the diagram, an image forming apparatus 400 of the embodiment 4 comprises: the input/output I/F unit 1; the attribute managing unit 2; the RAM 3; the operating unit 5; the time measuring unit 6; the print unit 7; the common bus 10; the apparatus state detecting unit 12; the continuous power supplying unit 13; the erasure extension number history managing unit 21; an erasure extension processing unit 31; a CPU 32; and a ROM 33. Only portions different from those in the embodiment 3 will be described hereinbelow. Portions similar to those in the embodiments 1 to 3 are designated by the same reference numerals as those in the embodiments 1 to 3 and their description is omitted.

The erasure extension processing unit 31 has therein: the elapsed time measuring means 11-1; erasure extension necessity inquiry means 31-1; and the erasure/extension decision processing means 4-3. When a predetermined time elapses from the reception of the confidential print job, the erasure extension processing unit 31 requests an answer about the necessity of the extension of the erasing time from the transmitting source. If the result of the answer indicates that the erasure extension is necessary, the elapsed time until the print job is erased after its reception is extended. If the answer result indicates that the erasure extension is unnecessary or if there is no answer, the confidential print job is erased. Further, when there is an inquiry about the confidential data information from the upper apparatus 51 (upper apparatus other than the upper apparatus which has transmitted the confidential print job), the erasure extension processing unit 31 transmits the confidential data information to the inquiry side, that is, the upper apparatus 51 which made the inquiry, and receives the extension/deletion request of the confidential data. This portion is activated by the CPU 32 which executes a predetermined control program which has previously been stored in the ROM 33.

When a result of the measurement by the elapsed time measuring means 11-1 indicates the elapse of the predetermined time, the erasure extension necessity inquiry means 31-1 transmits a message for requesting the answer about the necessity of the extension of the erasing time from the transmitting source and receives the answer result. Further, when there is an inquiry about the confidential data information from the upper apparatus 51 (upper apparatus other than the upper apparatus which has transmitted the confidential print job), the inquiry means 31-1 transmits the confidential data information to the inquiry side and receives the extension/deletion request of the confidential data.

The CPU 32 is a microprocessor for controlling the whole apparatus by executing the control program which has previously been stored in the ROM 33. Particularly, in the embodiment, the CPU 32 is a portion for activating the erasure extension processing unit 31 by executing the control program which has previously been stored in the ROM 33 in addition to the control in the embodiment 3.

The ROM 33 is a read only memory for previously storing the control program to control the whole apparatus by the CPU 32 which executes this control program. Particularly, in the embodiment, the ROM 33 is a read only memory for previously storing the control program to activate the erasure extension processing unit 31 by the CPU 32 which executes this control program.

The internal operation of the image forming apparatus 400 and the internal operation of the upper apparatus 51 will now be explained.

Figure 13:
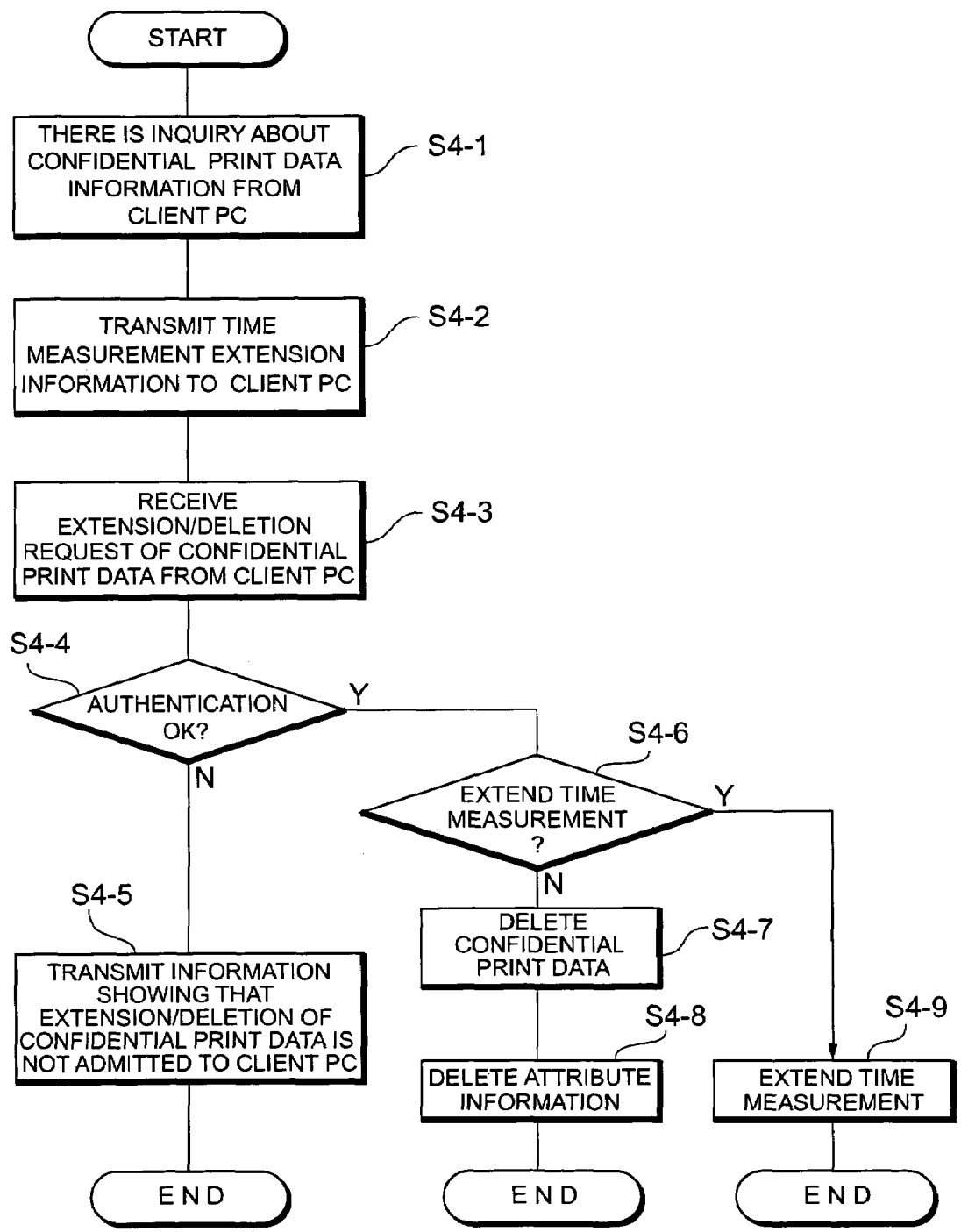
FIG. 13 is a flowchart for explaining the operation of an image forming apparatus in the embodiment 4.

FIG. 13 is a flowchart for explaining the operation of the image forming apparatus in the embodiment 4.

The operation of the image forming apparatus in the embodiment 4 will be described in order of steps S4-1 to S4-9 shown in the flowchart.

Step S4-1

The image forming apparatus 400 (FIG. 12) receives an inquiry of the confidential data information from the upper apparatus 51 (another upper apparatus not shown) through the network 50 (FIG. 12).

Step S4-2

When the inquiry of the confidential data information is received through the input/output I/F unit 1 (FIG. 12), the erasure extension necessity inquiry means 31-1 (FIG. 12) transmits the confidential data information to the inquiry side and inquires about the necessity of the erasure extension of the confidential data.

Step S4-3

The erasure extension necessity inquiry means 31-1 (FIG. 12) receives the erasure extension necessity signal of the confidential data from the upper apparatus 51 (upper apparatus other than the upper apparatus which has transmitted the confidential print job).

Step S4-4

The collating means 2-3 (FIG. 12) collates the data addition authentication information (password) stored in the attribute management information storing area 3-2 (FIG. 12) with the print request authentication information (password) received from the upper apparatus 51 (upper apparatus other than the upper apparatus which has transmitted the confidential print job). If the authentication can be obtained, the processing routine advances to step S4-6. If the authentication cannot be obtained, the processing routine advances to step S4-5.

Step S4-5

The erasure extension necessity inquiry means 31-1 (FIG. 12) returns a signal showing that the erasure extension necessity request of the confidential data is not admitted because the authentication cannot be obtained to the upper apparatus 51 (upper apparatus other than the upper apparatus which has transmitted the confidential print job) and the processing routine is finished.

Step S4-6

If the erasure extension necessity request of the confidential data indicates that the erasure extension is necessary, step S4-9 follows. If it indicates that the erasure extension is unnecessary, step S4-7 follows.

Step S4-7

The erasure/extension decision processing means 4-3 (FIG. 12) erases the confidential print job from the confidential data storing area 3-1 (FIG. 12).

Step S4-8

The erasure/extension decision processing means 4-3 (FIG. 12) erases the corresponding confidential data attribute management information from the attribute management information storing area 3-2 (FIG. 12) and the processing routine is finished.

Step S4-9

The erasure/extension decision processing means 4-3 (FIG. 12) extends the erasing time and the processing routine is finished.

Figure 14:
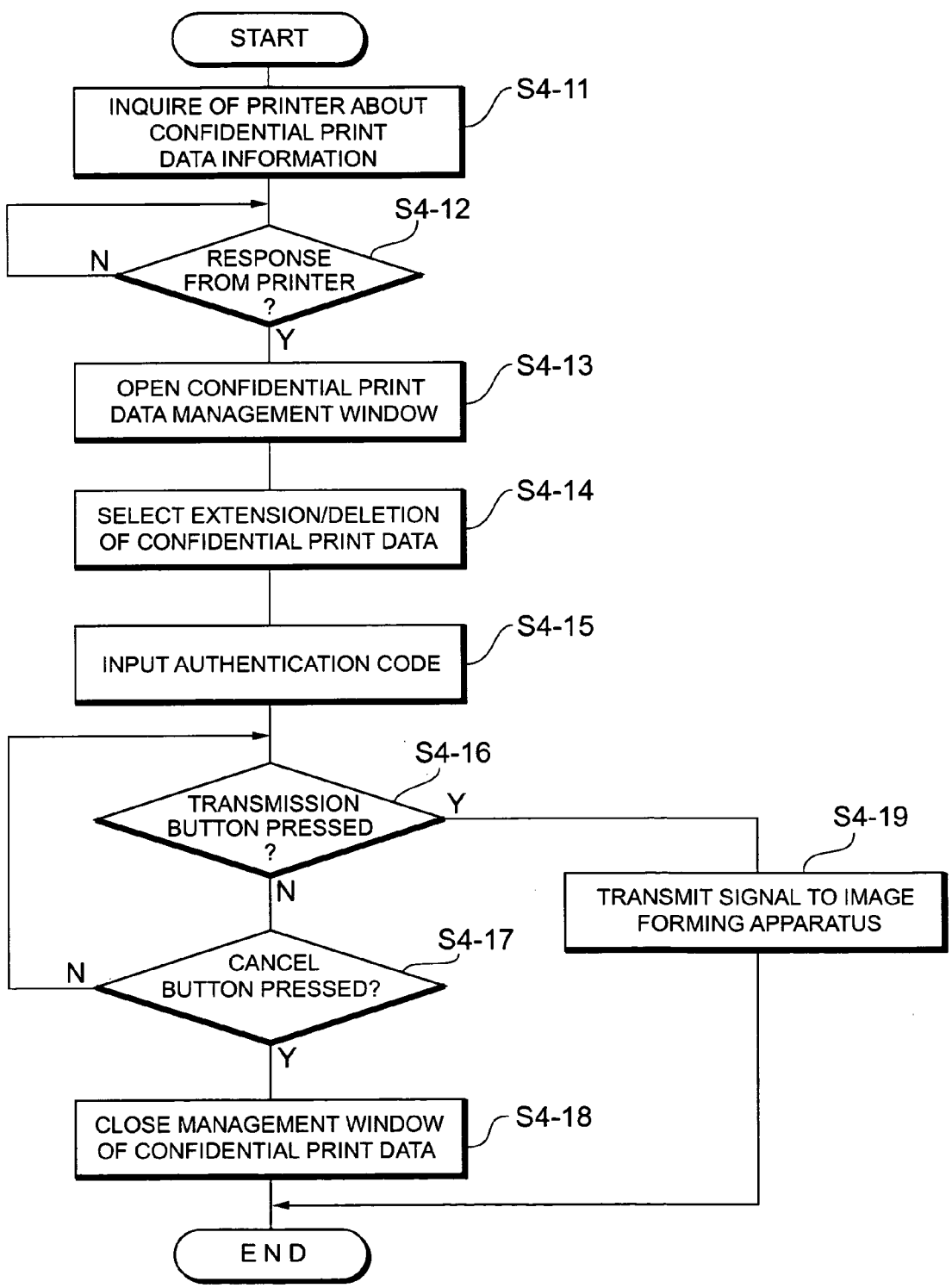
FIG. 14 is a flowchart for explaining the operation of an upper apparatus in the embodiment 4.

FIG. 14 is a flowchart for explaining the operation of the upper apparatus in the embodiment 4.

The operation of the upper apparatus in the embodiment 4 will be described in order of steps S4-11 to S4-19 shown in the flowchart.

Step S4-11

The upper apparatus 51 (upper apparatus other than the upper apparatus which has transmitted the confidential print job) inquires of the image forming apparatus 400 (FIG. 12) about the confidential data information through the network 50 (FIG. 12).

Step S4-12

The upper apparatus 51 (upper apparatus other than the upper apparatus which has transmitted the confidential print job) enters the standby mode while waiting for a response from the image forming apparatus 400 (FIG. 12). When there is a response (reception of the confidential data information), the processing routine advances to the next step.

Step S4-13

The control unit 51-2 (FIG. 12) displays the confidential data management information to the image display unit 51-1 (FIG. 12).

Figure 15:
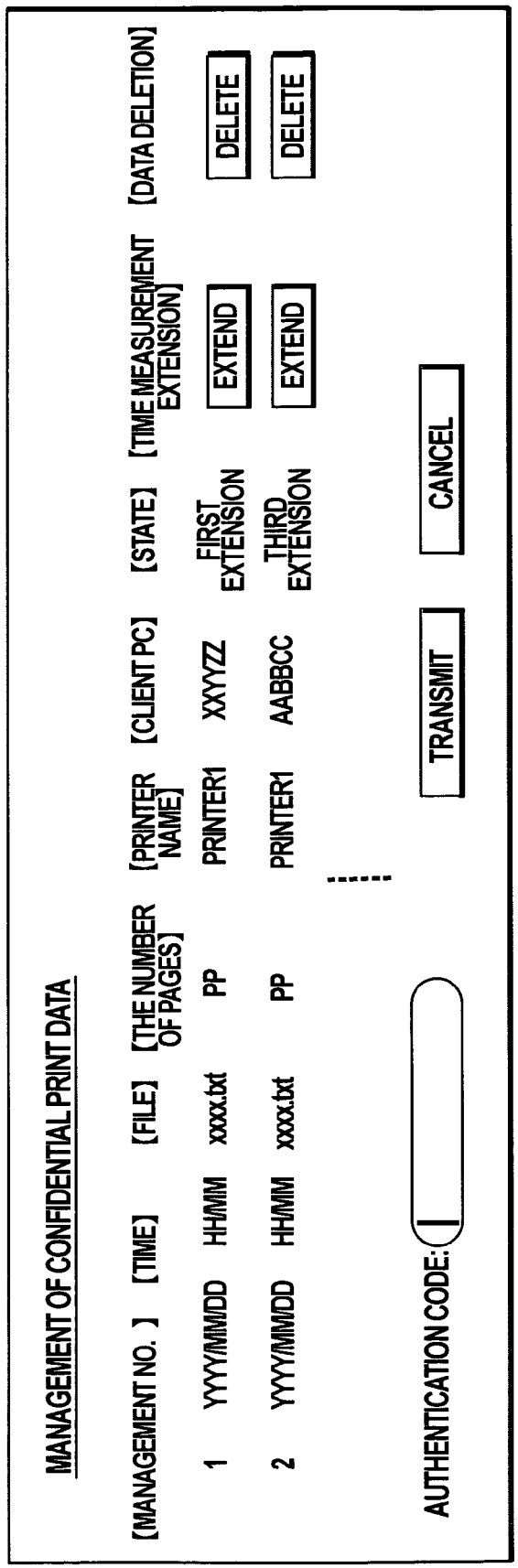
FIG. 15 is an image for displaying confidential data management information.

FIG. 15 is an image for displaying the confidential data management information.

As shown in the diagram, as contents to specify the confidential print job, "management No.", "time", "file", "the number of pages", "printer name", "client PC", "state", "time measurement extension", and "data deletion" are displayed in the confidential data management information display image. In step S4-14, the operator (print output requester) specifies the confidential data by those items, inputs an authentication code (his own password), clicks "transmit" or "cancel", and transmits the erasure extension necessity request of the confidential data. Returning to FIG. 14, the explanation of the operation of the upper apparatus in the embodiment 4 will be continued in order of the processing steps.

Step S4-14

The operator (print output requester) specifies the confidential data on the basis of the confidential data management information display image (FIG. 15).

Step S4-15

The operator (print output requester) inputs the authentication code (his own password) on the basis of the confidential data management information display image (FIG. 15).

Step S4-16

When the operator (print output requester) clicks or depresses the transmission button on the basis of the confidential data management information display image (FIG. 15), step S4-19 follows. If he does not click or depress it, step S4-17 follows.

Step S4-17

When the operator (print output requester) clicks or depresses the cancel button on the basis of the confidential data management information display image (FIG. 15), step S4-18 follows. In the other cases, the apparatus enters the standby mode while waiting for the input from the operator (print output requestor).

Step S4-18

The control unit 51-2 (FIG. 12) closes the confidential data management information display image (FIG. 15) displayed in the image display unit 51-1 (FIG. 12) and the processing routine is finished.

Step S4-19

The control unit 51-2 (FIG. 12) transmits the erasure extension necessity signal of the confidential data to the image forming apparatus through the input/output unit 51-3 (FIG. 12) and the processing routine is finished.

As described above, according to the embodiment, since the operator can request the extension necessity of the confidential print job from the upper apparatus other than the upper apparatus which has transmitted the confidential print job, an effect in which a risk that the predetermined time is wastefully consumed decreases is obtained.

Although the invention has been described above with respect to the case, as an example, where it is applied to the printing apparatus such as a printer or the like, the invention is not limited to such an example. That is, the invention can be also applied to another apparatus such as facsimile apparatus, copying apparatus, or the like.

It should be understood by those skilled in the art that various modifications, combination, sub-combinations and alterations may occur depending on design requirements and other factors insofar as they are within the scope of the appended claims or the equivalents thereof.

What is claimed is:

1. An image forming apparatus for receiving a print job having data addition authentication information and print-outputting on the basis of a result of a collation with print request authentication information comprising:
    a data addition authentication information detecting section which detects said data addition authentication information from said print job;
    a transmitting source specifying section which specifies a transmitting source of said print job;
    a storing unit which stores said detected data addition authentication information, said specified transmitting source of the print job, and the print job having said data addition authentication information;
    an input unit which receives said print request authentication information;
    an elapsed time measuring section which measures an elapsed time from the reception of the print job having said data addition authentication information;
    an erasure extension necessity inquiry section which requests an answer about necessity of an erasing time extension from said transmitting source when a result of the measurement by said elapsed time measuring section indicates elapse of a predetermined time; and
    an erasure/extension decision processing section which, if the answer result by said erasure extension necessity inquiry section indicates that the erasure extension is necessary, extends an elapsed time until said print job is erased after the reception of said print job by a predetermined time.

2. The image forming apparatus according to claim 1, further comprising an apparatus state detecting unit which monitors the occurrence and recovery of an abnormal state in the apparatus and measures a time until the abnormal state is recovered after the occurrence of the abnormal state, and
    wherein said erasure/extension decision processing section stops progress of the elapsed time until said print job is erased after the reception of said print job for a period of time until the abnormal state is recovered after the occurrence of the abnormal state measured by said apparatus state detecting unit.

3. The image forming apparatus according to claim 1, further comprising an erasure extension number history managing unit which manages the number of times of the operation by said erasure extension necessity inquiry section for requesting the answer about the necessity of the erasing time extension from a predetermined upper apparatus, and when said number of operation times reaches a predetermined number of times, erases the print job having said data addition authentication information and its attribute management information from said storing unit without making the extension request to the corresponding upper apparatus.

4. The image forming apparatus according to claim 1, wherein said erasure extension necessity inquiry section further has a function of, when an inquiry of confidential data information regarding the print job having said data addition authentication information is made by an upper apparatus other than said transmitting source, transmitting said confidential data information to the upper apparatus which made said inquiry and receiving an extension/deletion request of said confidential data.

5. The image forming apparatus according to claim 1, wherein when said answer result indicates that the erasure extension is unnecessary, said erasure/extension decision processing section erases said data addition authentication information, said transmitting source of the print job, and the print job having said data addition authentication information from said storing unit.

6. The image forming apparatus according to claim 5, further comprising an apparatus state detecting unit which monitors the occurrence and recovery of an abnormal state in the apparatus and measures a time until the abnormal state is recovered after the occurrence of the abnormal state, and
    wherein said erasure/extension decision processing section stops progress of the elapsed time until said print job is erased after the reception of said print job for a period of time until the abnormal state is recovered after the occurrence of the abnormal state measured by said apparatus state detecting unit.

7. The image forming apparatus according to claim 5, further comprising an erasure extension number history managing unit which manages the number of times of the operation by said erasure extension necessity inquiry section for requesting the answer about the necessity of the erasing time extension from a predetermined upper apparatus, and when said number of operation times reaches a predetermined number of times, erases the print job having said data addition authentication information and its attribute management information from said storing unit without making the extension request to the corresponding upper apparatus.

8. The image forming apparatus according to claim 5, wherein said erasure extension necessity inquiry section further has a function of, when an inquiry of confidential data information regarding the print job having said data addition authentication information is made by an upper apparatus other than said transmitting source, transmitting said confidential data information to the upper apparatus which made said inquiry and receiving an extension/deletion request of said confidential data.

9. The image forming apparatus according to claim 1, wherein when said answer result indicates that the erasure extension is unnecessary, said erasure/extension decision processing section sends said print job stored in said storing unit to said transmitting source of said print job, and erases said transmitting source of said print job.

10. An image forming apparatus for printing and outputting a stored print job, comprising:
 a communicating section to execute a communication with an upper apparatus;
 a storing section to store said print job received from said upper apparatus by said communicating section;
 a time measuring unit to measure a stored time of said stored print job; and
 an erasure/extension decision processing section which inquires of said upper apparatus whether it is necessary to extend to store said print job stored in said storing section after said stored time of said print job elapses a previously decided time, and if said erasure/extension decision processing section judges that it is not necessary to extend, sends said print job stored in said storing section to said upper apparatus via said communicating section, and erases said print job from said storing section.

* * * * *

UNITED STATES PATENT AND TRADEMARK OFFICE
CERTIFICATE OF CORRECTION

PATENT NO.       : 7,646,499 B2                                    Page 1 of 1
APPLICATION NO.  : 11/358403
DATED            : January 12, 2010
INVENTOR(S)      : Masafumi Hayakawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 996 days.

Signed and Sealed this

Sixteenth Day of November, 2010

David J. Kappos
*Director of the United States Patent and Trademark Office*